(12) United States Patent
Wilson

(10) Patent No.: US 10,655,756 B2
(45) Date of Patent: *May 19, 2020

(54) METHOD OF GOVERNING THE ELEVATION, ATTITUDE AND STRUCTURAL INTEGRITY OF A PRESSURE-CONTAINING VESSEL IN A BODY OF LIQUID

(71) Applicant: Michael W. N. Wilson, Aberdeenshire (GB)

(72) Inventor: Michael W. N. Wilson, Aberdeenshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/790,985

(22) Filed: Oct. 23, 2017

(65) Prior Publication Data

US 2018/0087691 A1 Mar. 29, 2018

Related U.S. Application Data

(63) Continuation of application No. 14/290,660, filed on May 29, 2014, now Pat. No. 9,797,525.

(51) Int. Cl.
*F16L 1/12* (2006.01)
*F16L 1/20* (2006.01)
(Continued)

(52) U.S. Cl.
CPC ............... *F16L 1/20* (2013.01); *B63B 35/03* (2013.01); *B63C 7/08* (2013.01); *B63G 8/14* (2013.01); *F16L 1/163* (2013.01); *F16L 1/24* (2013.01)

(58) Field of Classification Search
CPC .......................... B63B 2207/02; F16L 1/163
See application file for complete search history.

(56) References Cited

U.S. PATENT DOCUMENTS 3,369,515 A * 2/1968 Endo ............... B63G 8/42
114/74 R
3,425,453 A 2/1969 Fuller
(Continued)

FOREIGN PATENT DOCUMENTS

BE 642407 5/1964
FR 80801 6/1963
(Continued)

OTHER PUBLICATIONS

"Pioneering handling solutions for transforming subsea development and operations in the offshore energy sector", 2015, Publisher: Smarter Subsea Handling, Div. of Deep Sea Recovery, Lt.d.

*Primary Examiner* — Janine M Kreck
(74) *Attorney, Agent, or Firm* — Frank J. Catalano; Gable Gotwals

(57) ABSTRACT

A method for governing the elevation, attitude and structural integrity of a pressure-containing vessel in a body of liquid counterbalances flotation and incompressible ballast mediums against each other in separate serial compartments. Varying the quantity of incompressible ballast medium allows control of the elevation and attitude of the vessel. If the flotation medium is compressible, varying the quantity of flotation medium allows control of the ambient pressure of the vessel. The method facilitates floating and towing and laying of an undersea pipeline on, to and at a deep water site.

4 Claims, 10 Drawing Sheets

(51) Int. Cl.
*B63B 35/03* (2006.01)
*B63C 7/08* (2006.01)
*B63G 8/14* (2006.01)
*F16L 1/24* (2006.01)
*F16L 1/16* (2006.01)

(56) References Cited

U.S. PATENT DOCUMENTS

| | | | | |
|---|---|---|---|---|
| 3,437,065 | A | * | 4/1969 | Robbins, Jr. ............ B63G 8/26 114/125 |
| 3,812,922 | A | | 5/1974 | Stechler |
| 3,977,201 | A | | 8/1976 | Bittner |
| 4,887,931 | A | * | 12/1989 | Frisby ..................... F16L 1/12 405/171 |
| 5,163,379 | A | | 11/1992 | Chorley |
| 5,941,189 | A | * | 8/1999 | Johansson ............... B63B 1/107 114/121 |
| 6,354,764 | B1 | | 3/2002 | Brown |
| 6,357,966 | B1 | | 3/2002 | Thompson |
| 7,841,917 | B2 | | 11/2010 | Pritchard |
| 8,136,470 | B1 | | 3/2012 | Buescher et al. |
| 9,797,525 | B2 | * | 10/2017 | Wilson .................... B63C 7/08 |
| 2004/0139899 | A1 | | 7/2004 | Scott |
| 2012/0120759 | A1 | | 5/2012 | Le Page et al. |

FOREIGN PATENT DOCUMENTS

| | | |
|---|---|---|
| GB | 2377002 A | 12/2002 |
| GB | 2427173 | 12/2006 |
| JP | 391184 | 2/1939 |
| JP | 57054790 A | 4/1982 |
| JP | 2000304160 A | 11/2000 |
| WO | 03002848 | 1/2003 |
| WO | 2004056650 | 7/2004 |
| WO | 2010052493 | 5/2010 |

* cited by examiner

METHOD OF GOVERNING THE ELEVATION, ATTITUDE AND STRUCTURAL INTEGRITY OF A PRESSURE-CONTAINING VESSEL IN A BODY OF LIQUID

REFERENCE TO RELATED APPLICATIONS

This is a continuation application claiming priority to U.S. application Ser. No. 14/290,660 filed May 29, 2014.

BACKGROUND OF THE INVENTION

This invention relates generally to the use of pressure-containing vessels to control the elevation and attitude of objects submerged in a body of liquid, especially in environments where hydrostatic crush is of significant concern. The objects may be connected to one or more pressure containing vessels, such as subsea jackets used to support wind turbines or oil rig platforms. The objects may be the pressure-containing vessels, such as pipelines.

In a presently known method of moving an object from one subsea location to another or raising and lowering an object between the surface and the seabed, small glass microspheres containing air or other gas are dispersed in a body of liquid to form a buoyant fluid. The fluid can be injected into or evacuated from a bladder which is disposed inside of a rigid housing. A valve allows seawater to be injected into or evacuated from a void in the housing and around the bladder. If the void is water filled, as the bladder is expanded or contracted by the addition or evacuation of fluid, water will be evacuated from or admitted into the void in the housing.

The depths at which the microsphere/bladder system can effectively operate are limited. The fluid is a dispersion of the gas-containing microspheres in a liquid and is, therefore, incompressible. The gas contained in the microspheres is the predominant source of system buoyancy. The wall thickness of each microsphere must be sufficient to withstand the proportionate-to-depth internal anti-hydrostatic pressure of the housing. Therefore, the operating depth is limited by the competing interests of pressure-withstanding microsphere wall thickness and the volume of buoyancy-providing gas in the microspheres.

The attitude of the housing of the microsphere/bladder system in the water cannot be controlled. When the bladder is not fully expanded, its shape, and therefore the distribution of gas in the housing, is unpredictable. Even if the bladder is fully expanded, there is no external structure guaranteeing that its position in the housing is constant. And, even if the bladder does initially assume its intended shape and location in the housing, if the distribution of gas in the bladder is uneven, the housing will experience unpredictable changes in shape and location during operation. The purpose of the glass microspheres is to assure that the buoyant gas they contain is evenly distributed in the liquid that is used to fill the bladder. Regardless of the orientation of the bladder in the housing, if sufficient microspheres are damaged or destroyed, perhaps by depth increases as explained above, their gas is freely dispersed into the liquid, and the stability of the system is compromised.

The ratios of buoyant fluid to water is not known throughout the operation of the microsphere/bladder system. The bladder changes its shape as the liquid containing the microspheres is added to or evacuated from the bladder, but the void between the bladder and the housing may never be fully evacuated of air or water. Therefore, while the amount of the liquid in the bladder may be controlled, the ratio of housing-contained liquid to water is not precisely known. Furthermore, because the microsphere/bladder system requires the bladder to expand to a substantial part of the total housing, use of an elongated housing, such as a pipeline, is impractical.

In present shallow water pipeline laying practices, buoyant primary pipelines are capped and floated to the laying site and, by controlled flooding with seawater, are submerged to the seabed while non-buoyant primary pipelines, perhaps containing one or more cables and/or other pipelines, have piggybacked secondary pipelines which are capped and provide sufficient buoyancy to float the combination. The primary pipeline, or primary and piggybacked secondary pipelines together, are floated to the laying site where the primary, or primary and/or secondary pipelines, can be control-flooded to provide the necessary ballast to submerge the primary pipeline.

The present applications of known shallow water pipeline laying practice are illustrated in FIG. 1. Each block of FIG. 1 shows the primary pipeline $P_P$ in its floated condition prior to controlled flooding with water to cause the primary pipeline $P_P$ to sink. Block 1 shows an empty primary pipeline $P_P$ which is filled with air A. Block 2 shows an empty primary pipeline $P_P$ which is filled with air A and is piggybacked to a secondary pipeline $P_S$ which is also filled with air A. Block 3 shows a primary pipeline $P_P$ which is filled with air A and contains a cable/other pipeline Z. Block 4 shows a primary pipeline $P_P$ which is filled with air A and contains a cable/other pipeline Z and is piggybacked to a secondary pipeline $P_S$ which is also filled with air A.

None of these FIG. 1 applications are useful in deep water applications. Without a piggybacked secondary pipeline $P_S$, a primary pipeline $P_P$ heavy enough to sink to deep water levels cannot be floated. On the other hand, a secondary piggybacked pipeline $P_S$ satisfactory to provide flotation for a non-buoyant primary pipeline $P_P$ must have such thin walls that the secondary piggybacked pipeline $P_S$ will be destroyed by hydrostatic crush before deep water levels are reached. Therefore, the presently known shallow water flotation practices are effective to submerge pipelines only to depths in a range of 60 to 70 meters. If primary pipelines are intended to contain one or more cables and/or other pipelines, the weight of their contents must also be overcome, likely reducing the maximum depth that can be reached to less than 60 or 70 meters. If the air contained by the secondary pipeline were compressed, it might be possible to reach a depth of approximately 100 meters before hydrostatic crush occurs, but 100 meters is still relatively shallow for offshore pipelines.

In laying pipelines at greater depths, delivery is presently, and has for about a half century been, accomplished in one of two ways. In some applications, sticks of pipe are transported to a laying-site welding platform the pipeline is assembled offshore. In other applications, the pipeline is assembled on shore and plastically coiled onto a reel. The reel of coiled pipeline is transported to the laying site. The offshore-assembled or reel delivered pipeline is then laid on the seabed by known J-lay or S-lay techniques.

When delivering sticks of pipe to the site, the size of the delivery vessel is generally dictated by a comparison of its size and cost with the time and expense of the total number of trips required between the shore and the site to deliver all the sticks needed to construct the pipeline. When delivering reels of pipeline to the site, the number of trips is greatly reduced but the cost of the vessel increases exponentially.

Whether by pipeline flotation or reeled pipeline delivery, the cost of laying, for example, a 30" diameter pipeline 1,500 meters in length in deep water typically ranges from $10,000,000 to $30,000,000. If the product pipeline is intended to contain one or more cables and/or other pipelines, the time and costs associated with the construction and/or the delivery of the pipeline off-shore are further exacerbated.

In sum, there are known object handling practices with depth and control limitations, known pipeline laying practices which can use crafts as small as tugboats but are limited to very shallow water applications and known pipeline laying practices for deep water applications which involve much larger ships and/or great time and expense and are still fraught with hydrostatic crush complications.

It is, therefore, a primary object of this invention to provide a method for controlling the elevation and attitude of pressure-containing vessels in a body of liquid. It is also an object of this invention to provide a method for controlling the elevation and attitude of objects connected to pressure-containing vessels in a body of liquid. It is another object of this invention to provide a method of delivering pipelines to and laying pipelines at offshore deep-water laying sites which is less costly and less time-consuming than known methods and which facilitates the present method of controlling the elevation and attitude of pressure controlling vessels and of objects connected to pressure-containing vessels. A further object of this invention is to provide a method for controlling the elevation and attitude of pressure controlling vessels and of objects connected to pressure-containing vessels which counteracts the varying forces of hydrostatic crush over great changes in depth.

SUMMARY OF THE INVENTION

In accordance with the invention, a method is provided for governing the elevation, attitude and structural integrity of a pressure-containing vessel in a body of liquid.

As used herein, a flotation medium is one which is capable of increasing the buoyancy of the vessel. An incompressible ballast medium is one which is capable of decreasing the buoyancy of the vessel. According to the method, flotation and ballast mediums are selected for such capabilities as applied to the vessel and to the vessel and an object to be attached to the vessel and/or the load capability of any external device used to control the depth and attitude of the vessel in the body of liquid. The vessel is divided into reciprocal serial hydraulically discrete compartments, one for containing the selected flotation medium and the other for containing the selected incompressible ballast medium. As used herein, the compartments of the vessel are reciprocal in that their separate volumes taken together are constant, serial in that they are sequential within the vessel and hydraulically discrete in that they each contain only their corresponding medium. The selected flotation medium in the flotation medium compartment is counterbalanced against the selected incompressible ballast medium in the ballast medium compartment. Counterbalanced as used in this sense means that each compartment of the vessel is filled with its corresponding medium. The quantity of incompressible ballast medium in the ballast medium compartment is then varied to control the elevation of the pressure-containing vessel in the body of liquid.

Dividing the vessel can be accomplished by positioning a pig held in confinement by the inner walls of the vessel between the flotation and incompressible ballast mediums or by selecting flotation and incompressible ballast mediums which, when abutting, create an impermeable interface therebetween.

Varying the quantity of incompressible ballast medium in the ballast medium compartment can be accomplished by (a) adding at least sufficient incompressible ballast medium to the ballast medium compartment to cause the vessel to descend in the body of liquid; (b) evacuating at least sufficient incompressible ballast medium from the ballast medium compartment to cause the vessel to rise in the body of liquid; or (c) either adding or evacuating sufficient incompressible ballast medium from the ballast medium compartment to cause the vessel to maintain a constant elevation in the body of liquid.

Varying the quantity of incompressible ballast medium in the ballast medium compartment can be further accomplished by adding incompressible ballast medium to the ballast medium compartment to cause the vessel to (a) descend more rapidly in the body of liquid; (b) rise more slowly in the body of liquid; or (c) maintain a constant elevation in the body of liquid. Varying the quantity of incompressible ballast medium in the ballast medium compartment can also be further accomplished by evacuating incompressible ballast medium from the ballast medium compartment to cause the vessel to (d) descend more slowly in the body of liquid; (e) rise more rapidly in the body of liquid; or (f) maintain a constant elevation in the body of liquid.

In addition to causing the vessel to descend, ascend or maintain constant elevation, varying the quantity of incompressible ballast medium can also be used for other specific purposes. If the vessel is caused to rest on the bed of the body of liquid, additional incompressible ballast medium can be added into the ballast medium compartment until the vessel is filled with the incompressible ballast medium and the flotation medium is evacuated from the vessel. The compartments can then be closed to their respective sources of the flotation and ballast mediums. If the vessel is caused to rest on the surface of the body of liquid, additional flotation medium can be added into the flotation medium compartment until the vessel is filled with the flotation medium and the incompressible ballast medium is evacuated from the vessel. The compartments can then be closed to their respective sources of the flotation and incompressible ballast mediums.

If the selected flotation medium is incompressible, whether a liquid or a gel, both mediums are incompressible. In this case, counterbalancing the mediums can be accomplished by initially filling the vessel with either the flotation or the ballast medium and then exchanging a portion of that medium with a portion of the other medium. Once the mediums are counterbalanced, varying the quantity of incompressible ballast medium contained in the ballast compartment can then be accomplished by exchanging a quantity of either one of the mediums in its respective compartment for a quantity of the other medium in its respective compartment.

If the flotation medium is compressible, whether composed of one or more gases, the quantity of the flotation medium contained in the flotation medium compartment and/or the incompressible ballast medium contained in the ballast medium compartment can be varied to cause the internal pressure of the pressure-containing vessel to be within a counterbalancing range of the pressure-containing vessel against ambient pressure. Varying only the flotation medium quantity will control the pressure without significant impact on buoyancy while varying the ballast medium quantity will impact both pressure and buoyancy.

If the flotation medium is compressible, counterbalancing of the flotation and ballast mediums may be accomplished by filling the vessel with either the flotation or the ballast medium and then exchanging a portion of that medium with a portion of the other medium. Once the mediums are counterbalanced, varying the quantity of incompressible ballast medium in the ballast medium compartment can be accomplished by (a) adding at least sufficient incompressible ballast medium to the ballast medium compartment to cause the vessel to descend in the body of liquid; (b) evacuating at least sufficient incompressible ballast medium from the ballast medium compartment to cause the vessel to rise in the body of liquid; or (c) either adding or evacuating sufficient incompressible ballast medium from the ballast medium compartment to cause the vessel to maintain a constant elevation in the body of liquid.

Varying the quantity of incompressible ballast medium in the ballast medium compartment can also be further accomplished by adding incompressible ballast medium to the ballast medium compartment to cause the vessel to (a) descend more rapidly in the body of liquid; (b) rise more slowly in the body of liquid; or (c) maintain a constant elevation in the body of liquid or evacuating incompressible ballast medium from the ballast medium compartment to cause the vessel to (d) descend more slowly in the body of liquid; (e) rise more rapidly in the body of liquid; or (f) maintain a constant elevation in the body of liquid.

The method may further include selecting a vessel with vertical and/or horizontal axes of symmetry, such as a hollow body with circular or polygonal cross-sections transverse to one of the axes of symmetry, a pipe wound in a loop, a spiral or a helix about one of the axes of symmetry or a linear pipe aligned on one of the axes of symmetry.

Furthermore, the shape and attitude of the vessel can be coordinated with the shape and attitude of an object connected to the vessel and the center of buoyancy of the vessel and the center of buoyancy of the object coordinated in the body of liquid so that not only the elevation but also attitude of the object in the body of liquid can be controlled by the vessel.

The method may also include the selection of multiple vessels and the coordination of the shapes and attitudes of each vessel with the shape and orientation of the object connected to the vessels so that the elevation and attitude of the object in the body of liquid can be controlled by applying the method to control each of the vessels. In a multi-vessel object-manipulating application, if the flotation medium is compressible, as earlier discussed the method can further include the step of varying the quantity of the flotation medium contained in the flotation medium compartments of each vessel and/or the incompressible ballast medium contained in the ballast medium compartments of each vessel to cause the internal pressure of the pressure-containing vessels to be within a counterbalancing range of their respective ambient pressure capabilities.

The method is very useful in laying offshore pipelines, including those laid at exceedingly great depths. To do this, the method is applied as hereinbefore discussed, but only after the pipeline is first floated and towed to the laying site.

Using a liquid or a light gel as a flotation medium the primary pipeline is floated by association with the flotation medium and then towed with the associated flotation medium to the pipe laying site. In some applications, the primary pipeline may be the pressure-containing vessel, in which case association with the flotation medium is accomplished by pumping sufficient flotation medium into the primary pipeline to cause the primary pipeline to float. In other applications, the vessel may be a secondary pipeline, in which case association with the flotation medium is accomplished by piggybacking the secondary pipeline to the primary pipeline and pumping sufficient flotation medium into the secondary pipeline to cause the primary pipeline to float. In still other applications, the primary and secondary pipelines will both be pressure containing vessels, in which case association with the flotation medium is accomplished by piggybacking the secondary pipeline to the primary pipeline and pumping sufficient flotation medium into the primary pipeline and the secondary pipeline to cause the primary pipeline to float.

Using a gas or combination of gases as a flotation medium, the vessel may be a secondary pipeline, in which case floating the primary pipeline by association with the flotation medium is accomplished by piggybacking the secondary pipeline to the primary pipeline and pumping sufficient flotation medium into the secondary pipeline to cause the primary pipeline to float.

In each and all of the above pipeline applications, the method may also include installing at least one cable and/or other pipeline throughout the length of the primary pipeline prior to the step of floating the primary pipeline by association with the flotation medium. In such cases, sufficient flotation medium will be pumped into the primary and/or secondary pipelines to cause the primary and/or secondary pipelines and the installed cables and/or other pipelines to float.

BRIEF DESCRIPTION OF THE DRAWINGS

Other objects and advantages of the invention will become apparent upon reading the following detailed description and upon reference to the drawings in which.

While the invention will be described in connection with preferred embodiments thereof, it will be understood that it is not intended to limit the invention to those embodiments or to the details of the construction or arrangement of parts illustrated in the accompanying drawings.

DETAILED DESCRIPTION

Pressure-Containing Vessels

The structure and shape of a pressure-containing vessel intended to control the elevation and attitude of an object submerged in a body of liquid will primarily be determined by the shape and center of buoyancy of the object to be controlled by the vessel, by the attitudes the object is to assume in the body of liquid and the depths which the vessel is expected to reach during its operation.

Usually, the chosen vessel will be symmetric, such as a spherical, cylindrical, conical or cubic container. Pipelines may be treated as cylindrical vessels and, in pipeline laying applications, the pipeline may be the vessel and the object to be controlled. When pipe is involved, the length of the pipe or pipeline may be straight and/or curved and may be, or may include, one or more loops, spirals or helical coils. Some vessels may be partly or entirely asymmetric. Multiple vessels of varying types and shapes may be used in combination without departing from the principles of the invention.

Insofar as this disclosure is concerned, various relevant forces should be accounted for in controlling the elevation and attitude of the vessel in the body of liquid. As to the vessel, these forces include the weight of the vessel, the weight of any object to be attached to the vessel and the load capability of any external device used to control the depth and attitude of the vessel in the body of liquid. As to the ambient environment of the vessel, these forces include the hydrostatic crush that will be applied to the vessel at various depths in the body of liquid and the buoyancy applied by the host liquid to the vessel. All of these forces are determinable by known methods before implementation of the invention.

Figure 2A:
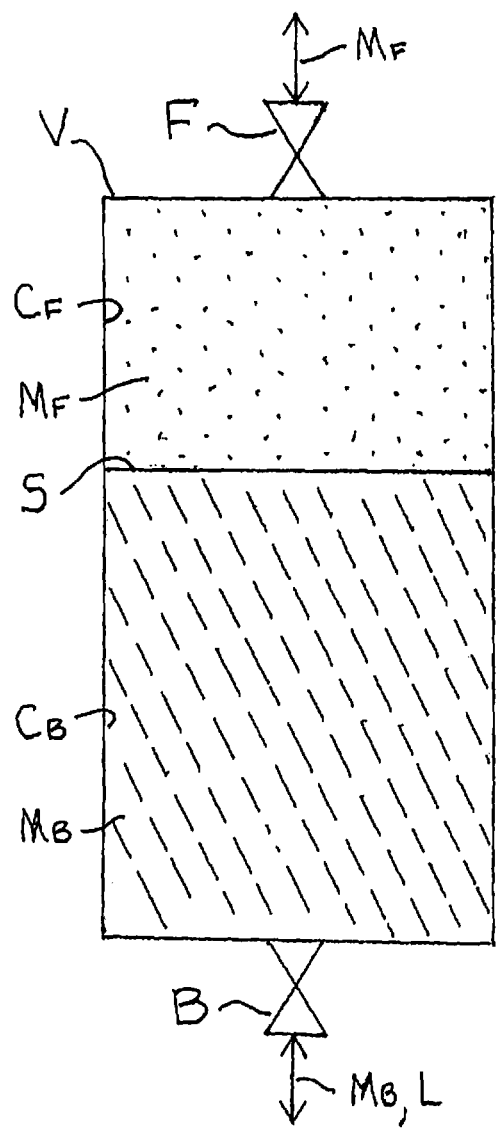
FIGS. 2A-2B are block diagrams illustrating first and second embodiments of the method in accordance with this invention of governing the elevation, attitude and structural integrity of a pressure containing vessel in a body of liquid.
Figure 2B:
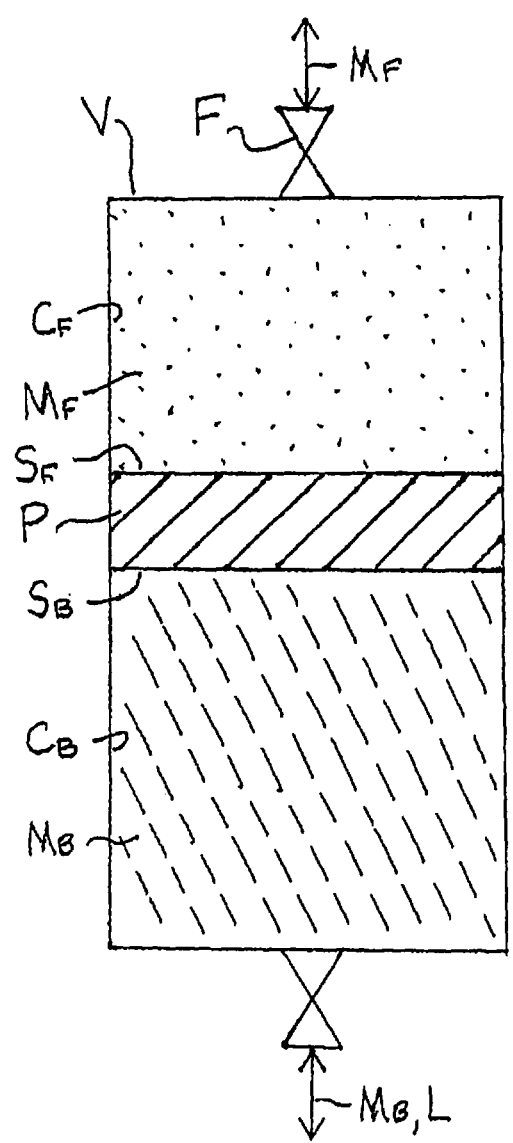

Looking at FIGS. 2A and 2B, a cylindrical tank is chosen as the vessel V for the purpose of explaining the general principles of the present invention. As shown, the vessel V is divided into two reciprocal serial hydraulically discrete compartments $C_F$ and $C_B$. As used herein, the compartments $C_F$ and $C_B$ of the vessel V are reciprocal in that their separate volumes taken together are constant, serial in that they are sequential within the vessel V and hydraulically discrete in that, during the operation of the vessel V, they each contain only their corresponding selected flotation medium $M_F$ or incompressible ballast medium $M_B$.

As used herein, a flotation medium $M_F$ is one which is capable of increasing the buoyancy of the vessel in the host liquid L. A ballast medium $M_B$ is one which is capable of decreasing the buoyancy of the vessel in the host liquid. According to the method, flotation and ballast mediums $M_F$ and $M_B$ are selected for such buoyancy capabilities in relation to the vessel V or, when applicable, to the vessel V and an object to be attached to the vessel V. As used herein, unless otherwise specified, a selected flotation medium $M_F$ may be a gas, a liquid or a gel. A selected ballast medium $M_B$ may be a liquid or a gel.

Looking at the example of FIGS. 2A and 2B, by controlling the volume of incompressible ballast medium $M_B$ in its respective compartment $C_B$, the volume of the other compartment $C_F$ is also controlled and known. In this example, the body of liquid L and the incompressible ballast medium $M_B$ are chosen to be one and the same. However, this will not always be the case.

As seen in FIG. 2A, the division of the vessel V into the compartments $C_F$ and $C_B$ is illustrated as a surface of separation S which is the natural result of an interface of the opposing mediums $M_F$ and $M_B$ if the mediums are impervious to each other. If they are not, as seen in FIG. 2B, the division of the vessel V into compartments $C_F$ and $C_B$ will be accomplished by the use in the vessel V of one or more liquid or amorphous jelly pigs P. Of course, the pig P may also be used even if the mediums $M_F$ and $M_B$ are mutually impermeable.

In FIG. 2A, as incompressible medium $M_B$ is evacuated from or admitted to the vessel V through its respective valve B, the surface of separation S is reciprocated accordingly. Simultaneously, the flotation medium $M_F$ is admitted to or evacuated from the vessel V through its respective valve F or allowed to expand or compress in the vessel V. Simultaneous admission and expansion or evacuation and compression of the flotation medium $M_F$ are also permissible. In FIG. 2B, when a pig P is used, it will move in similar fashion as the surface of separation S between the mediums $M_F$ and $M_B$ with its perimeter sealed against the inside walls of the vessel V. Vessels of greater internal volume require less sophisticated valves.

Pigs P may be liquid or amorphous jelly pigs. Liquid pigs are formed in a vessel by the confinement of the pig liquid in the vessel between the opposing surfaces of mediums which are impervious to the pig liquid but not necessarily impervious to each other. An amorphous jelly pig has a predetermined shape contoured to normally span and seal against the greatest possible cross-section of the vessel V and a memory biasing the pig P to that shape. However, the pig P will conform to the restrictive forces applied to it by the rigid walls of the vessel V and by the pressure applied by the mediums $M_F$ and $M_B$ to the opposed surfaces $S_F$ and $S_B$ of the pig P which are not in contact with the vessel V. In applications in which one or more cables and/or other pipelines Z are contained within a pipeline, pigs are able to conform to the inside wall of the vessel V and the outside walls of the contents Z. Thus, for liquid and jelly pigs, as the volume of the incompressible medium $M_B$ in one of the compartments $C_B$ is varied, the pig P will move along the walls of the vessel V, assuming any shape permitted by the forces of the vessel walls, the surfaces of the opposed mediums $M_F$ and $M_B$ and the outside walls of any contents Z to reach a condition of equilibrium in the vessel V. Jelly pigs suitable for the purposes of this disclosure are available from the Aubin Group of Ellon, Aberdeenshire, Scotland.

Whether by an impermeable interface S or by use of a pig P, the vessel V is divided into two or more hydraulically discrete compartments $C_F$ and $C_B$. Each hydraulically discrete compartment is defined by the walls of the vessel V and the surface of separation S afforded by an interface of opposed mutually impermeable mediums as seen in FIG. 2A or by the end surfaces of a pig P as seen in FIG. 2B. As noted above in reference to a pig P, the surface of separation is actually two surfaces $S_F$ and $S_B$, one on the flotation end and the other on the ballast end, respectively, of the pig P. However, it being the purpose of the pig P to structurally provide opposite wall surfaces reciprocating in unison, they are herein referred to as one surface S. In either case, the volumes of the compartments $C_F$ and $C_B$ are always complementary and their total is always the volume of the vessel V less the volume filled by the pig P, if a pig P is used.

Continuing to look at FIGS. 2A and 2B, assuming the vessel V had a known volume of incompressible ballast medium $M_B$, the volume of incompressible ballast medium $M_B$ remaining in the vessel V at any time can always be known if the volume of incompressible ballast medium $M_B$ which thereafter flows out of or into the vessel V, respectively, is known. Furthermore, if the inner cross-sectional area of the vessel V is, as shown, linearly constant, the remaining volume of ballast medium $M_B$ will be directly proportional to the distance between the surface of separation S and the ballast end of the vessel V. Thus, the volume of ballast medium $M_B$ in the vessel V can be determined if the flow of ballast medium $M_B$ is metered and/or the location of the interface or pig P in the vessel V is known.

In some applications of the method, for example when horizontally oriented vessels are used, it may be necessary to not only to control the buoyancy of the vessel in the host liquid but also to control the distribution of buoyancy forces within the vessel. Rigging can be used to maintain the vessel in its horizontal orientation regardless of buoyancy applied forces, Multiple compartments can be serially arranged in a single vessel, for example a flotation compartment between two ballast compartments, to balance the buoyancy applied forces. Then too, multiple vessels can be used with each vessel cooperating with others to cancel their unbalanced buoyancy applied forces.

Vessel Internal Pressure Control

Further considering FIGS. 2A and 2B, if the selected flotation medium $M_F$ is also incompressible, as the flotation and ballast mediums $M_F$ and $M_B$ are exchanged, the internal pressure of the vessel V will remain constant. If the ballast medium $M_B$ is the same as the host liquid L, then the ballast valve B can be left open and flotation medium $M_F$ can be used to vary buoyancy.

If, however, the flotation medium $M_F$ is compressible, then flotation medium $M_F$ and/or ballast medium $M_B$ can be added to or evacuated from its vessel compartment $C_F$ and/or $C_B$ without evacuating and/or adding the other medium $M_B$ and/or $M_F$ from or to its vessel compartment $C_B$ and/or $C_F$, thus increasing or decreasing the internal pressure of the vessel V, respectively. The internal pressure in the flotation compartment $C_F$ can be monitored to provide real time data indicative of the pressure level of the vessel V vis a vis the hydrostatic crush applied to the vessel V at its varying depths in the liquid L.

The introduction of a compressible flotation medium $M_F$ and, if necessary, a pig P into the vessel V does not defeat the ability to meter the amount of ballast medium $M_B$ evacuated from or admitted into the vessel V. The total volume of the vessel V is a given. The volume occupied by the pig P, if any, is a given. If the vessel V is initially filled with ballast medium $M_B$, the initial volume of ballast medium $M_B$ will be the volume of the vessel V less the volume of the pig P, if any. If the vessel V is initially filled with flotation medium $M_F$, the vessel V contains no ballast medium $M_B$. Since the total volume of both compartments $C_F$ and $C_B$ is a constant, the metered transfer of ballast medium $M_B$ determines the volume of both flotation and ballast mediums $M_F$ and $M_B$ in the vessel V at all times. Therefore, the internal pressure of the vessel V can be controlled directly in response to a pressure reading and/or in response to the metered or otherwise determined flow of ballast medium $M_B$ into or out of the vessel V.

The method of controlling any one or more of the elevation, attitude and ambient pressure can be automated by controlling the flotation, ballast and flow meter valves F, B and Y in response to, for example, one or more of the flow of ballast medium $M_B$ into and out of the ballast compartment $C_B$ and the internal pressure and depth of each vessel V used in a given application with additional connections to supplies of ballast and floatation mediums $M_B$ and $M_F$.

Initial Conditions for Applying the Method

Figure 3A:
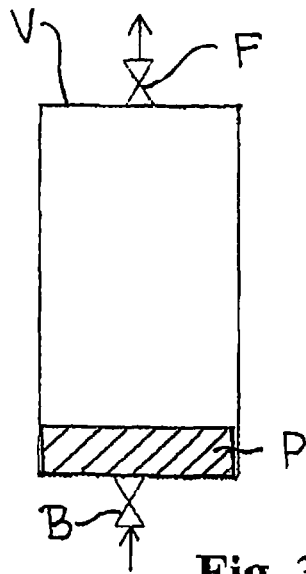
FIGS. 3A-3D are block diagrams illustrating the steps of preparing a two compartment pressure-containing vessel for use in the present method.
Figure 3B:
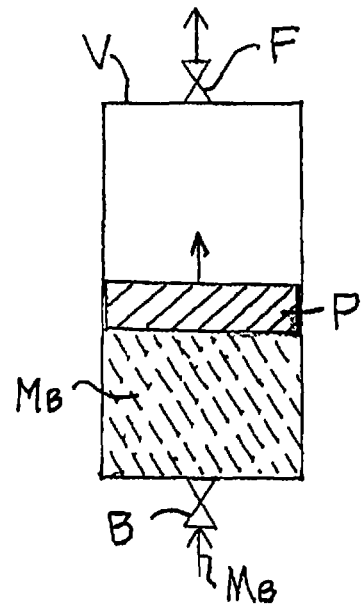
Figure 3C:
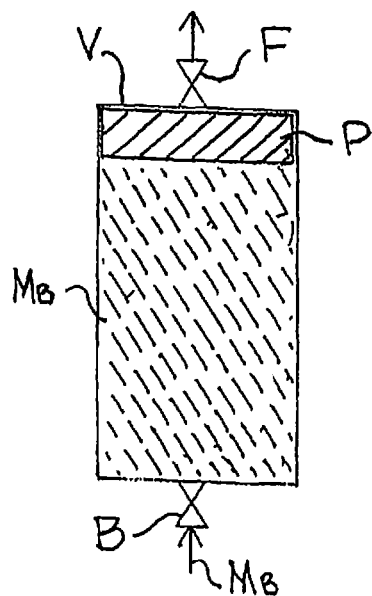
Figure 3D:
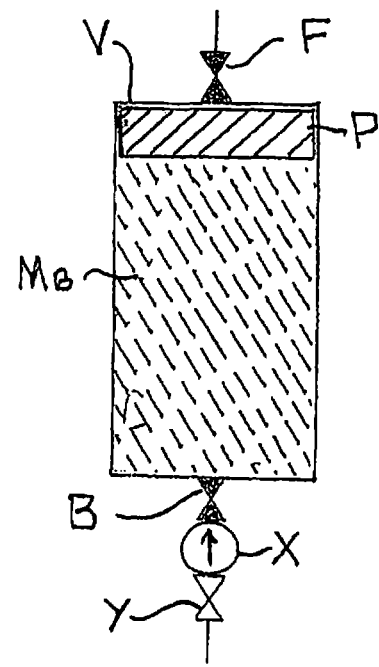

Turning to FIG. 3A, preparation of the vessel V for use in the method can, for example, be accomplished by first injecting a pig P, if necessary and as shown, into the vessel V at the ballast valve B. Then, as seen in FIG. 3B, as incompressible ballast medium $M_B$ is added to the vessel V through the ballast valve B, the interface, or as shown the pig P, will sweep across the vessel V toward the float valve F. Looking at FIG. 3C, the vessel V is filled with the incompressible ballast medium $M_B$ when the interface, or as shown the pig P, reaches the float valve F. As seen in FIG. 3D, the float and ballast valves F and B can then be closed and a ballast flow meter X and flow meter valve Y serially connected to the ballast valve B. The pig P, if necessary, can be introduced at either valve F or B of the vessel V and then caused by the flotation or ballast medium $M_F$ or $M_B$ associated with that valve F or B to sweep toward the other valve B or F of the vessel V. This is a preferred, but not only, way of preparing the vessel V for use in the present method. It is only important that a vessel V of known total volume is ultimately filled with a known volume of incompressible ballast medium $M_B$ in one compartment $C_B$ and a remaining volume of flotation medium $M_F$ in the other compartment $C_F$ and, if necessary, a pig P.

Figure 3E:
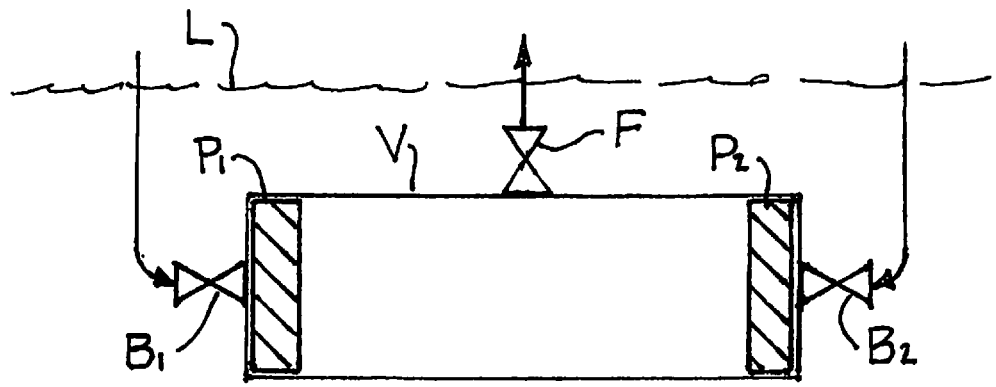
FIGS. 3E-3G are block diagrams illustrating the steps of preparing a three compartment pressure-containing vessel for use in the present method.
Figure 3F:
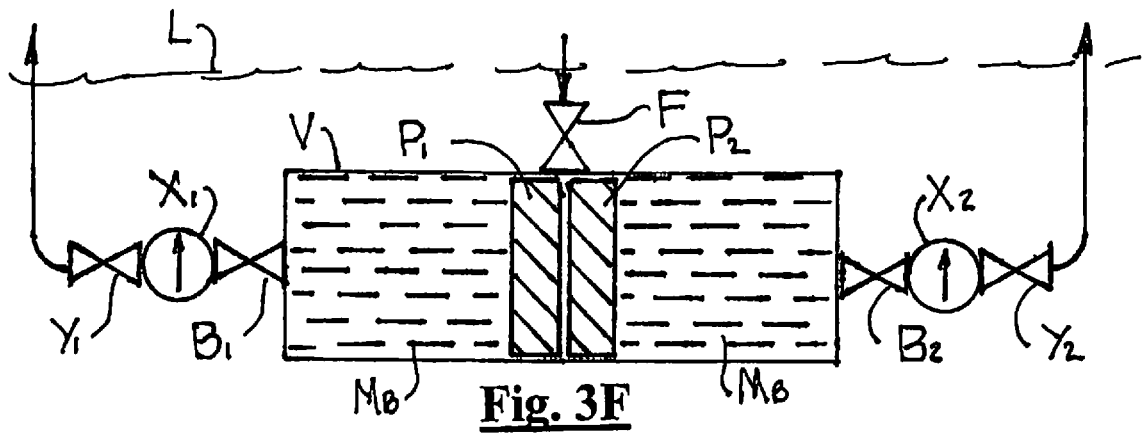
Figure 3G:
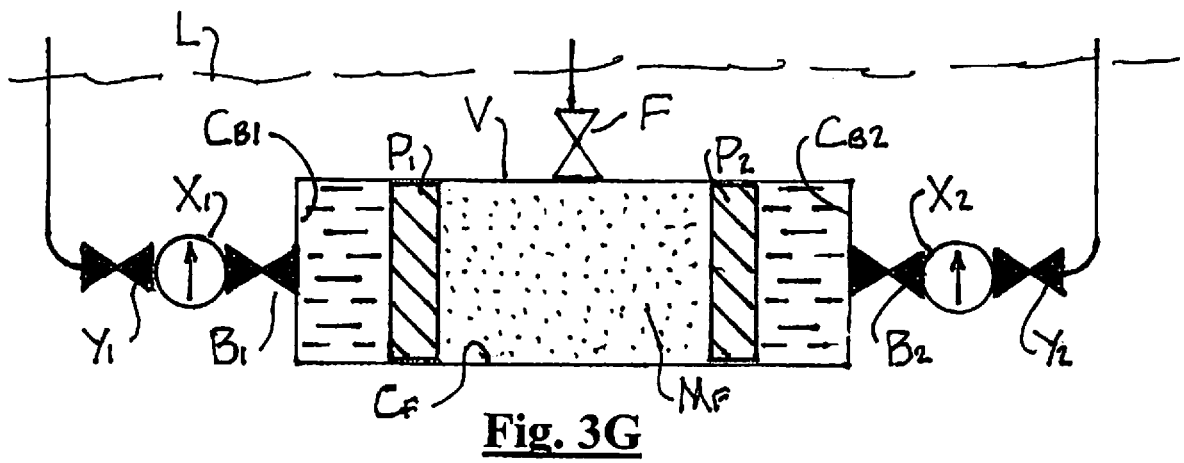

FIGS. 3E, 3F and 3G illustrate an application in which more than two compartments are used. In this example, in a horizontal vessel $V_H$ a flotation compartment $C_F$ is sandwiched between two ballast compartments $C_{B1}$ and $C_{B2}$. Flotation medium $M_F$ can be admitted and evacuated via a float valve F at the center of the vessel $V_H$ and ballast medium $M_B$ evacuated and admitted via ballast valves $B_1$ and $B_2$, one at each end. Two pigs $P_{B1}$ and $P_{B2}$ divide the vessel $V_H$ into three compartments $C_F$, $C_{B1}$ and $C_{B2}$. One way to prepare such a vessel is to admit the two pigs $P_{B1}$ and $P_{B2}$, one at each of the ballast ends of the vessel $V_H$ as seen in FIG. 3E and then admit equal quantities of ballast medium $M_B$ through ballast valves $B_1$ and $B_2$ at each end of the vessel $V_H$ to drive the pigs $P_{B1}$ and $P_{B2}$ toward a centered float valve F to evacuate the non-ballast contents of the vessel $V_H$ through the float valve F and bring the pigs $P_{B1}$ and $P_{B2}$ together, as seen in FIG. 3F. Then, as seen in FIG. 3G, flotation medium $M_F$ can be admitted at the float valve F as ballast medium $M_B$ is evacuated through flow meters $X_1$ and $X_2$ and flow meter valves $Y_1$ and $Y_2$ in equal quantities from the vessel $V_H$. The principles of the method are the same.

The Method for all Flotation Mediums

Returning to FIGS. 2A and 2B, whether the flotation medium is compressible or incompressible, the present method of governing the elevation of a pressure-containing vessel in a body of liquid is the same. Flotation and ballast mediums $M_F$ and $M_B$ are selected in accordance with the buoyancy criteria as hereinbefore discussed. The vessel V is divided into reciprocal serial hydraulically discrete compartments $C_F$ and $C_B$, one for containing the selected flotation medium $M_F$ and the other for containing the selected incompressible ballast medium $M_B$. The selected flotation medium $M_F$ in the flotation medium compartment $C_F$ is counterbalanced against the selected incompressible ballast medium $M_B$ in the ballast medium compartment $C_F$. The mediums $M_F$ and $M_B$ are deemed to be counterbalanced when both compartments $C_F$ and $C_B$ are filled with their own respective medium $M_F$ or $M_B$ and the compartment volumes are in a state of equilibrium. In this condition, the quantity of incompressible ballast medium $M_B$ in the ballast medium compartment $C_B$ can be varied to control the elevation of the pressure-containing vessel V in the body of liquid L.

The quantity of incompressible ballast medium $M_B$ in the ballast medium compartment $C_B$ can be varied to cause the vessel V to descend, ascend or maintain a constant elevation in the body of liquid L. Descent can be caused by adding incompressible ballast medium $M_B$ to the ballast medium compartment $C_B$ until the vessel V begins to descend. Ascent can be caused by evacuating incompressible ballast medium $M_B$ from the ballast medium compartment $C_B$ until the vessel V begins to ascend. A constant elevation can be maintained by either adding or evacuating incompressible ballast medium $M_B$ to or from the ballast medium compartment $C_M$ until the vessel V is neither descending nor ascending.

The quantity of incompressible ballast medium $M_B$ in the ballast medium compartment $C_B$ can be further varied by adding incompressible ballast medium $M_B$ to the ballast medium compartment $C_B$ to cause a descending vessel V to descend more rapidly or to cause an ascending vessel V to ascend more slowly or to maintain a constant elevation in the body of liquid L. Similarly, the quantity of incompressible ballast medium $M_B$ in the ballast medium compartment $C_B$ can be further varied by evacuating incompressible ballast medium $M_B$ from the ballast medium compartment $C_B$ to cause an ascending vessel V to ascend more rapidly or to cause a descending vessel V to descend more slowly or to maintain a constant elevation in the body of liquid L. If, for example, the vessel V is descending to the bed of the liquid L, the quantity of ballast medium $M_B$ can be reduced so as to slow its descent and allow the vessel V to land softly on the bottom.

If the vessel V is caused to rest on the bed of the body of liquid L, additional incompressible ballast medium $M_B$ can be added into the ballast medium compartment $C_B$ until the vessel V is filled with the incompressible ballast medium $M_B$ and the flotation medium $M_F$ is evacuated from the vessel V. The compartments $C_F$ and $C_B$ can then be closed to their respective sources of the flotation and ballast mediums $M_F$ and $M_B$. If the vessel V is caused to float on the surface of the body of liquid L, additional flotation medium $M_F$ can be added into the flotation medium compartment $C_F$ until the vessel V is filled with the flotation medium $M_F$ and the incompressible ballast medium $M_B$ is evacuated from the vessel V. The compartments $C_F$ and $C_B$ can then be closed to their respective sources of the flotation and incompressible ballast mediums $M_F$ and $M_B$.

If a pig P is used, it can be left in the vessel V if the vessel V is not to be recovered or if it will be reused in the vessel V during its recovery. If it is desirable to recover the pig P from the vessel V, it can be extruded through one of the valves F or B of the vessel V or through other valves already or newly made part of the vessel V.

Incompressible Flotation Mediums

If the flotation medium $M_F$ is incompressible, either an incompressible gas or a liquid or a gel, both mediums $M_F$ and $M_B$ are incompressible. Therefore, counterbalancing the mediums $M_F$ and $M_B$ will require an exchange in which a quantity of one medium $M_F$ or $M_B$ is added to its respective compartment $C_F$ or $C_B$ while the same quantity of the other medium $M_B$ or $M_F$ is simultaneously evacuated from its respective compartment $C_B$ or $C_F$. Once the mediums $M_F$ and $M_B$ are counterbalanced, varying the quantity of incompressible ballast medium $M_B$ contained in the ballast compartment $C_B$ requires further simultaneous exchange of a quantity of either one of the mediums $M_F$ or $M_B$ in its respective compartment $C_F$ or $C_B$ for the same quantity of the other medium $M_B$ or $M_F$ in its respective compartment $C_B$ or $C_F$.

Compressible Flotation Mediums—Ambient Pressure Control

If the flotation medium $M_F$ is compressible, that is composed of one or more compressible gases, the quantity of the flotation medium $M_F$ contained in the flotation medium compartment $C_F$ and/or the incompressible ballast medium $M_B$ contained in the ballast medium compartment $C_B$ can be varied to cause the internal pressure of the pressure-containing vessel V to be within the counterbalancing range of the pressure-containing vessel V against ambient pressure. If only the quantity of flotation medium $M_F$ is varied, the internal pressure of the vessel V will be varied without significant impact on buoyancy of the vessel V. If the quantity of the ballast medium $M_B$ is varied, both the internal pressure and the buoyancy of the vessel V will be impacted.

For the compressible flotation medium $M_F$, counterbalancing may still be accomplished by filling the vessel V with either the flotation or the ballast medium $M_F$ or $M_B$ and then exchanging a quantity of that medium $M_F$ or $M_B$ with a quantity of the other medium $M_B$ or $M_F$. Once the mediums $M_F$ and $M_B$ are counterbalanced, a quantity of incompressible ballast medium $M_B$ can be added in the ballast medium compartment $C_B$ to cause the vessel V to descend in the body of liquid L, evacuated from the ballast medium compartment $C_B$ to cause the vessel V to ascend in the body of liquid L or added or evacuated to or from the ballast medium compartment $C_B$ to cause the vessel V to maintain a constant elevation in the body of liquid L.

Another quantity of incompressible ballast medium $M_B$ can be added to the ballast medium compartment $C_B$ to cause the vessel V to descend more rapidly in the body of liquid L, ascend more slowly in the body of liquid L or maintain a constant elevation in the body of liquid L. Similarly, another quantity of incompressible ballast medium $M_B$ can be evacuated from the ballast medium compartment $C_B$ to cause the vessel V to descend more slowly in the body of liquid L, to ascend more rapidly in the body of liquid L or to maintain a constant elevation in the body of liquid L.

A Vertically Oriented Cylindrical Vessel Using a Compressible Gas Flotation Medium and the Host Liquid as an Incompressible Ballast Medium Turning to FIGS. 4A-4D, the method is applied to control the depth of, and the internal pressure in, a pressure-containing cylindrical vessel 10 vertically oriented in a body of liquid, in this instance seawater W. A compressible flotation medium accessible from a source isolated from the seawater W is counterbalanced against a ballast medium taken from the seawater W.

Figure 4A:
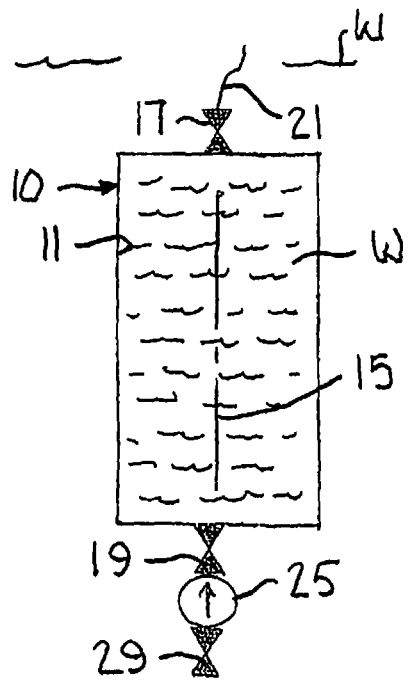
FIGS. 4A-4D are block diagrams illustrating the steps of the present method using a compressible flotation medium and a ballast medium derived from the host liquid in a vertically oriented cylindrical pressure-containing vessel.

This application of the method begins with the assumption that, as seen in FIG. 4A, the vessel 10 is prepared for use as described above in relation to FIG. 3D and is submerged in and filled with the seawater W. The cylindrical inner walls 11 of the vessel 10 are shown aligned on a vertical center axis 15. The vessel 10 has ports controlled by a float valve 17 and a ballast valve 19, respectively. As shown, the float valve 17 has been closed and connected by a conduit 21 to a source (not shown) of compressible gas 23. Also as shown, the ballast valve 19 has been closed and connected through a ballast flow meter 25 and a flow meter valve 29, which is closed, to the body of seawater W.

Figure 4B:
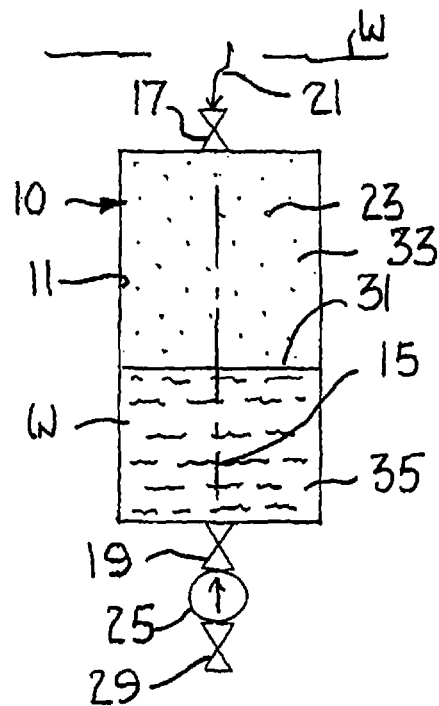

Looking at FIG. 4B, all three valves 17, 19 and 29 have been opened and compressible gas 23 is being pumped through the float valve 17 into the vessel 10, causing evacuation of the water W from the vessel 10 through the ballast valve 19 in a quantity measured by the ballast flow meter 25. Since the water W is incompressible, the vessel 10 is divided at the interface 31 into two compartments 33 and 35 of variably complementary volume. The quantity of water W remaining in the ballast compartment 35 is the total quantity of water W which filled the vessel 10 in FIG. 4A less the quantity of evacuated water W measured by the ballast flow meter 25.

Figure 4C:
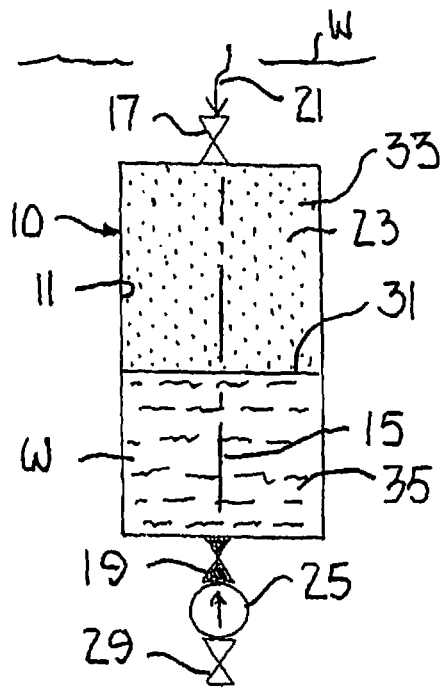

As seen in FIG. 4C, the ballast valve 19 has been closed, a predetermined amount of water W having been evacuated from the vessel 10 so as to cause the vessel 10 to descend toward its desired depth in the water W. Since the ballast valve 19 is closed, continued pumping of the compressible gas 23 through the flotation valve 17 into the vessel 10 increases the internal pressure of the vessel 10 without any significant change in the buoyancy of the vessel 10.

Figure 4D:
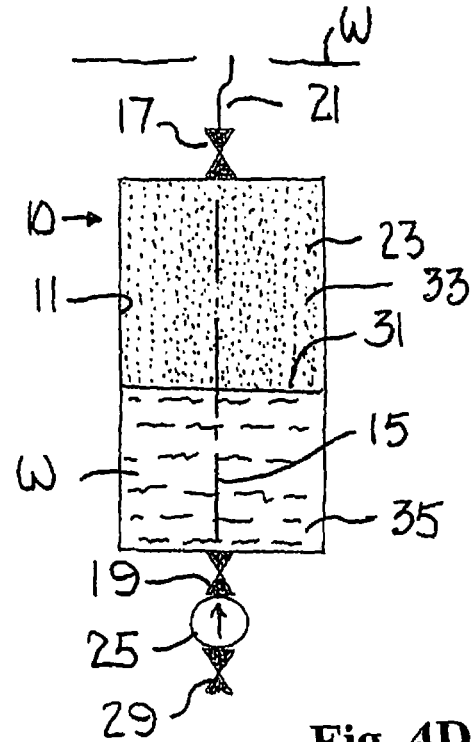

Moving on to FIG. 4D, the density of the compressible gas 23 has been increased sufficiently to bring the vessel internal pressure to a desired level to counteract the hydrostatic ambient pressure that is applied to the vessel 10. The flotation valve 17 has been closed, at least temporarily, to maintain the desired internal pressure of the vessel 10. This internal pressure can be monitored and increased or decreased by injecting or evacuating compressible gas 23 through the float valve 17 as the changing depth of the vessel 10 may require without changing the buoyancy of the vessel 10. If a change in quantity of ballast medium W in the vessel 10 is required, whether to slow or speed up the rate of descent of the vessel 10, the ballast and flow meter valves 19 and 29 can be opened to admit or evacuate metered amount of ballast medium W.

By appropriate further manipulation of the float and/or ballast valves 17 and 19 and 29, the location of the interface 37 in the vessel 10 can be reciprocally varied to raise or lower the vessel 10 in the water W while simultaneously, if desired, changing the density of the compressible flotation medium 23. Thus, changes in hydrostatic crush applied to the vessel 10 over a wide range of depths can be accommodated.

This application of the method is explained in specific relation to controlling a vertically oriented cylindrical vessel 10 in seawater W, but applies to all shapes of vessels, compressible gas flotation mediums and bodies of liquid. This application is also explained in relation to an impermeable surface of separation S, as discussed in relation FIG. 2A, which divides the vessel 10 into hydrostatically discrete compartments 33 and 35, in this case the interface 37 of mutually impermeable mediums 23 and W, as discussed above. However, this application is also useful if the vessel 10 is divided into compartments by one or more pigs, also as discussed above.

A Vertically Oriented Cylindrical Vessel Using a Compressible Gas Flotation Medium Source and an Incompressible Ballast Medium Source Independent of the Host Liquid Turning to FIGS. 5A-5D, the method is applied to control the depth of, and the internal pressure in, a cylindrical pressure-containing vessel 40 vertically oriented in a body of liquid L. A compressible flotation medium accessible from a source isolated from the body of liquid L is counterbalanced against and an incompressible ballast medium taken from another source isolated from the body of liquid L.

Figure 5A:
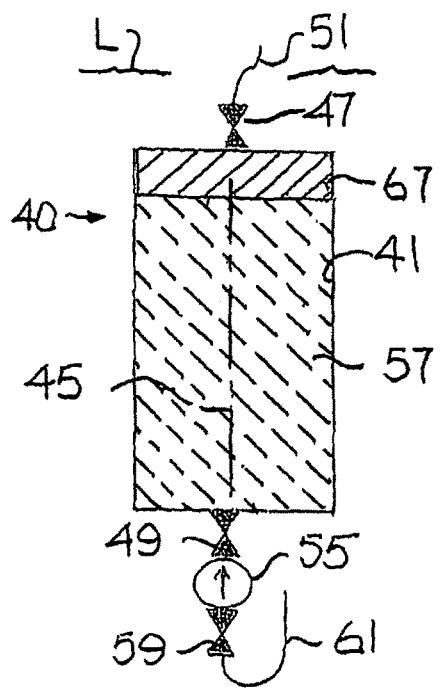
FIGS. 5A-5D are block diagrams illustrating the steps of the present method using an incompressible flotation medium and an independent source ballast medium in a vertically oriented cylindrical pressure-containing vessel.

This application of the method begins with the assumption that, as seen in FIG. 5A, a pig 67 has been introduced at the ballast valve 49 into the vessel 40 and that the vessel 40 has been prepared for use in the manner described above in relation to FIG. 3A and is submerged in the body of liquid L. The cylindrical inner walls 41 of the vessel 40 are shown aligned on a vertical center axis 45. The vessel 40 has ports controlled by a float valve 47 and a ballast valve 49, respectively. As shown, the float valve 47 has been closed and connected by a conduit 51 to a source (not shown) of compressible gas 53. The ballast valve 49 has been connected through a ballast flow meter 55, a flow meter valve 59 and a conduit 61 to a source (not shown) of incompressible ballast medium 57. The vessel 40 has been filled with incompressible ballast medium 57. The pig 67 has been driven by the incompressible ballast medium to the float valve 47 of the vessel 40. The ballast valve 49 has been closed.

Figure 5B:
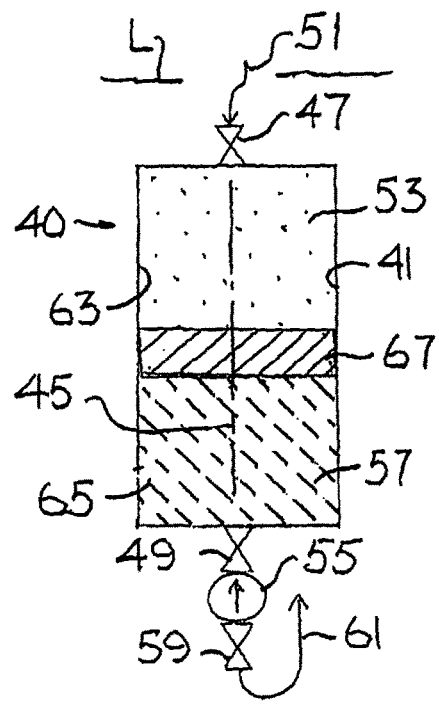

Looking at FIG. 5B, all three valves 47, 49 and 59 have been opened and compressible gas 53 is being pumped through the float valve 47 into the vessel 40, causing evacuation of the ballast medium 57 from the vessel 40 through the ballast valve 49 in a quantity measured by the ballast flow meter 55. Since the ballast medium 57 is incompressible, the vessel 40 is divided by the pig 67 into two compartments 63 and 65 of variably complementary volume. The quantity of ballast medium 57 remaining in the ballast compartment 55 is the total quantity of ballast medium 57 which filled the vessel 40 in FIG. 5A less the quantity of evacuated ballast medium 57 measured by the ballast flow meter 55.

Figure 5C:
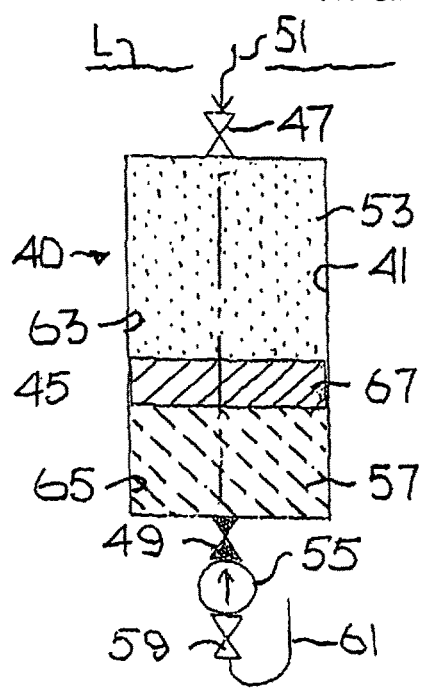

As seen in FIG. 5C, the ballast valve 49 has been closed, a predetermined amount of ballast medium 57 having been evacuated from the vessel 40 so as to cause the vessel 40 to descend toward its desired depth in the body of liquid L. Since the ballast valve 49 is closed, continued pumping of the compressible gas 53 through the float valve 47 into the vessel 40 increases the internal pressure of the vessel 40 without any significant change in the buoyancy of the vessel 40.

Figure 5D:
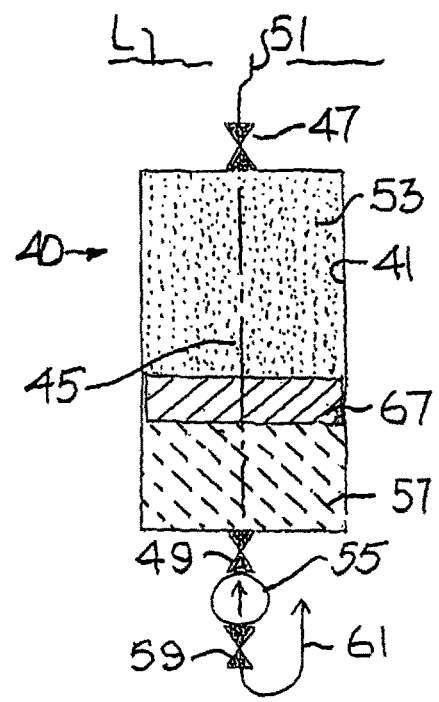

Moving on to FIG. 5D, the density of the compressible gas 53 has been increased sufficiently to bring the vessel internal pressure to a desired level to counteract the hydrostatic ambient pressure that is applied to the vessel 40. The float valve 47 has been closed, at least temporarily, to maintain the desired internal pressure of the vessel 40. This internal pressure can be monitored and increased or decreased by injecting or evacuating compressible gas 53 through the float valve 47 as the changing depth of the vessel 70 may require without changing the buoyancy of the vessel 40. If a change in quantity of ballast medium 57 in the vessel 40 is required, the ballast and flow meter valves 49 and 59 can be opened to admit or evacuate a metered amount of ballast medium 57.

By appropriate further manipulation of the float and/or ballast and flow meter valves 47 and 49 and 59, the location of the pig 67 in the vessel 40 can be reciprocally varied to raise or lower the vessel 40 in the body of liquid L while simultaneously, if desired, changing the density of the compressible flotation medium 53. Thus, changes in hydrostatic crush applied to the vessel 40 over a wide range of depths can be accommodated.

This application of the method is explained in specific relation to controlling a vertically oriented cylindrical vessel 40 in a body of liquid L, but applies to all shapes of vessels, compressible gas flotation mediums, incompressible ballast mediums and host liquids. This illustration is also explained in relation to the use of a pig 67 to separate the vessel 40 into hydraulically discrete compartments 63 and 65, as discussed above. However, this application is also useful if the vessel 40 is divided by mutually impermeable flotation and ballast mediums, also as discussed above.

A Horizontally Oriented Cylindrical Vessel with a Compressible Gas Flotation Medium Source and an Incompressible Ballast Medium Source Independent of the Host Liquid Turning to FIGS. 6A-6D, the method is applied to control the depth of, and the internal pressure in, a cylindrical pressure-containing vessel 70 horizontally oriented in a body of liquid L. A compressible flotation medium accessible from a source isolated from the body of liquid L is counterbalanced against and an incompressible ballast medium taken from another source isolated from the body of liquid L.

In the case of a horizontally oriented vessel, as shown a cylindrical vessel 70 with its center axis aligned a horizontal axis 75, the attitude or buoyancy balance of the vessel 70 can be maintained in any one or combinations of several ways as hereinbefore discussed. In this application, it is assumed that the rigging method is used for buoyancy balance control.

Figure 6A:
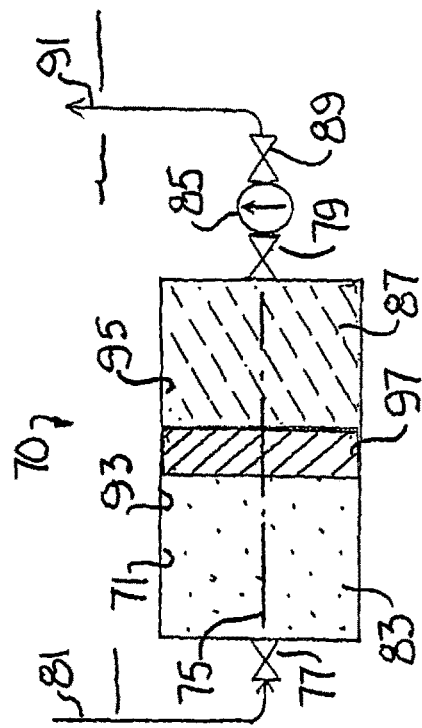
FIGS. 6A-6D are block diagrams illustrating the steps of the present method using a compressible flotation medium and an independent source ballast medium in a horizontally oriented cylindrical pressure-containing vessel.

In this application it is also assumed that, as seen in FIG. 6A, a pig 97 has been introduced at the ballast valve 49 into the vessel 70 and that the vessel 70 has been prepared for use in the manner described above in relation to FIG. 3D, except that the vessel 70 is horizontally oriented by the rigging, and is submerged in the body of liquid L. The cylindrical inner walls 71 of the vessel 70 are shown aligned on a horizontal center axis 75. The vessel 70 has ports controlled by a float valve 77 and a ballast valve 79, respectively. As shown, the float valve 77 has been connected by a conduit 81 to a source (not shown) of compressible gas 83 and the ballast valve 79 has been connected through a ballast flow meter 85, a flow meter valve 89 and a conduit 91 to a source of incompressible ballast medium 87. The vessel 70 is filled with incompressible ballast medium 87 and the pig 97 has been driven by the incompressible ballast medium 87 to the float valve 77 of the vessel 70. As shown, the valves 77, 79 and 89 have been closed.

Figure 6B:
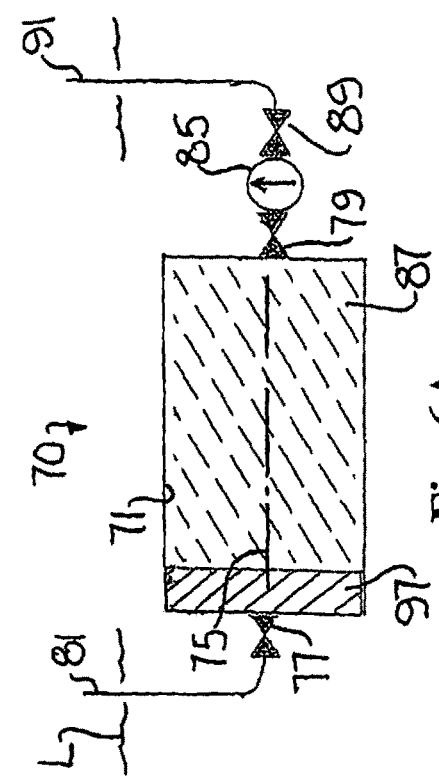

Looking at FIG. 6B, all three valves 77, 79 and 89 have been opened and compressible gas 83 is being pumped through the float valve 77 into the vessel 70, causing evacuation of the ballast medium 87 from the vessel 70 through the ballast valve 79 in a quantity measured by the ballast flow meter 85. Since the ballast medium 87 is incompressible, the vessel 70 is divided by the pig 97 into two compartments 93 and 95 of variably complementary volume. The quantity of ballast medium 87 remaining in the ballast compartment 85 is the total quantity of ballast medium 87 which filled the vessel 70 in FIG. 6A less the quantity of evacuated ballast medium 87 measured by the ballast flow meter 85.

Figure 6C:
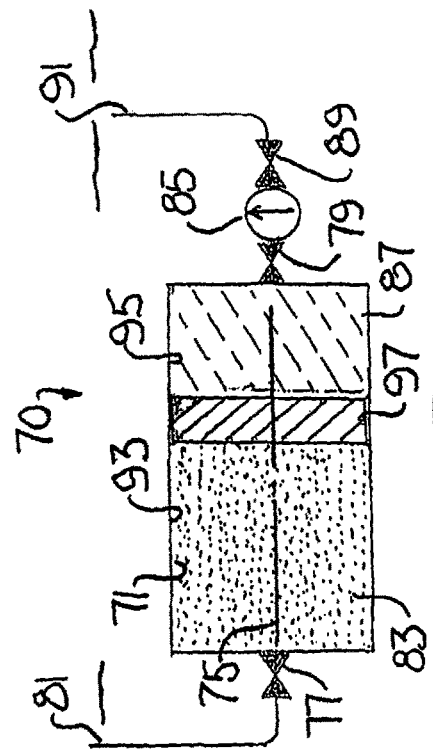

As seen in FIG. 6C, the ballast valve 79 has been closed, a predetermined amount of ballast medium 87 having been evacuated from the vessel 70 so as to cause the vessel 70 to descend toward its desired depth in the body of liquid L. Since the ballast valve 79 is closed, continued pumping of the compressible gas 83 through the float valve 77 into the vessel 70 increases the internal pressure of the vessel 70 without any significant change in the buoyancy of the vessel 70.

Figure 6D:
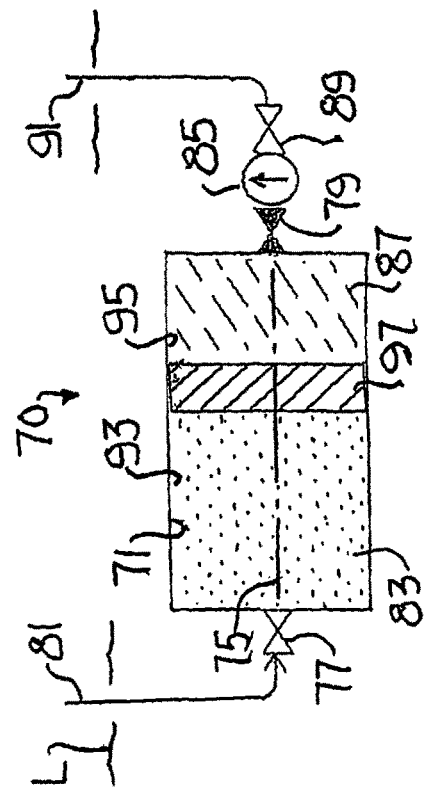

Moving on to FIG. 6D, the density of the compressible gas 83 has been increased sufficiently to bring the vessel internal pressure to a desired level to counteract the hydrostatic ambient pressure that is applied to the vessel 70. The float valve 77 has been closed, at least temporarily, to maintain the desired internal pressure of the vessel 70. This internal pressure can be monitored and increased or decreased by admitting or evacuating compressible gas 83 through the float valve 77 as the changing depth of the vessel 70 may require without changing the buoyancy of the vessel 70. If a change in quantity of ballast medium 87 in the vessel 70 is required, the ballast and flow meter valves 79 and 89 can be opened to admit or evacuate a metered amount of ballast medium 87.

By appropriate further manipulation of the float and/or ballast and flow meter valves 77 and 79 and 89, the location of the pig 97 in the vessel 70 can be reciprocally varied to raise or lower the vessel 70 in the body of liquid L while simultaneously, if desired, changing the density of the compressible flotation medium 83. Thus, changes in hydrostatic crush applied to the vessel 70 over a wide range of depths can be accommodated.

This application of the method is explained in specific relation to controlling a horizontally oriented cylindrical vessel 70 in a body of liquid L, but applies to all shapes of vessels, compressible gas flotation mediums, incompressible ballast mediums and host liquids. This illustration is also explained in relation to the use of a pig 97 to separate the vessel 70 into hydraulically discrete compartments 93 and 95, as discussed above. However, this application is also useful if the vessel 70 is divided by mutually impermeable flotation and ballast mediums, also as discussed above.

A Horizontally Oriented Helically Coiled Pipe Vessel with a Compressible Gas Flotation Medium Source and an Incompressible Ballast Medium Source Independent of the Host Liquid Turning to FIGS. 7A-7D, the method is applied to control the depth of, and the internal pressure in, a pressure-containing helically coiled pipe vessel 100 horizontally oriented in a body of liquid L. A compressible flotation medium accessible from a source isolated from the body of liquid L is counterbalanced against and an incompressible ballast medium taken from another source isolated from the body of liquid L.

In the case of a horizontally oriented vessel, as shown a helically coiled pipe with its center axis aligned a horizontal axis 105, the attitude or buoyancy balance of the vessel 100 can be maintained in any one or combinations of several ways as hereinbefore discussed. In this application, it is assumed that the rigging method is used for buoyancy balance control.

Figure 7A:
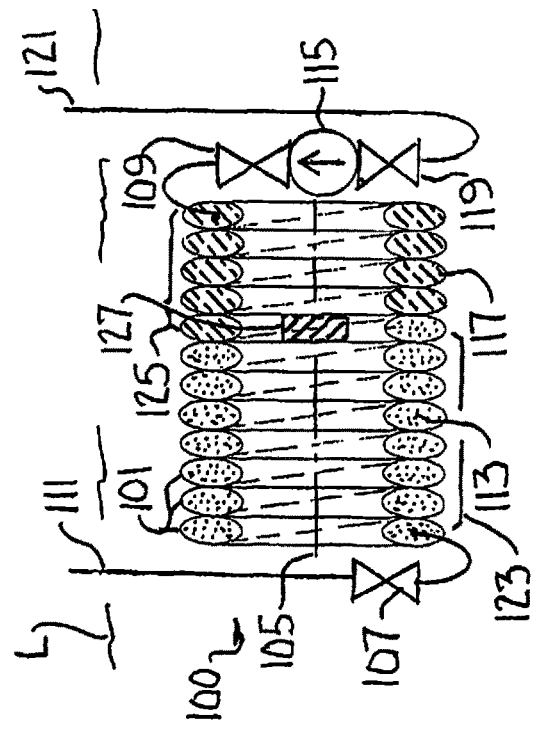
FIGS. 7A-7D are block diagrams illustrating the steps of the present method using a compressible flotation medium and an independent source ballast medium in horizontally oriented coiled pipe pressure-containing vessel.

This application of the method begins with the assumption that, as seen in FIG. 7A, a pig 127 has been introduced at the ballast valve 109 into the vessel 100 and that the vessel 100 has been prepared for use in the manner described above in relation to FIG. 3D, except that the vessel 100 is a horizontally oriented helically coiled pipe, and is submerged in the body of liquid L. The coils 101 of the vessel 100 are shown aligned on a horizontal center axis 105. The vessel 100 has ports controlled by a float valve 107 and a ballast valve 109, respectively. As shown, the float valve 107 has been connected by a conduit 111 to a source (not shown) of compressible gas 113 and the ballast valve 109 has been connected through a ballast flow meter 115, a flow meter valve 119 and a conduit 121 to a source of incompressible ballast medium 117. The vessel 100 has been filled with incompressible ballast medium 117 and the pig 127 has been driven by the incompressible ballast medium 117 through the coils 101 of the coiled pipe vessel 100 to the float valve 107 of the vessel 100. The valves 107, 109 and 119 have been closed.

Figure 7B:
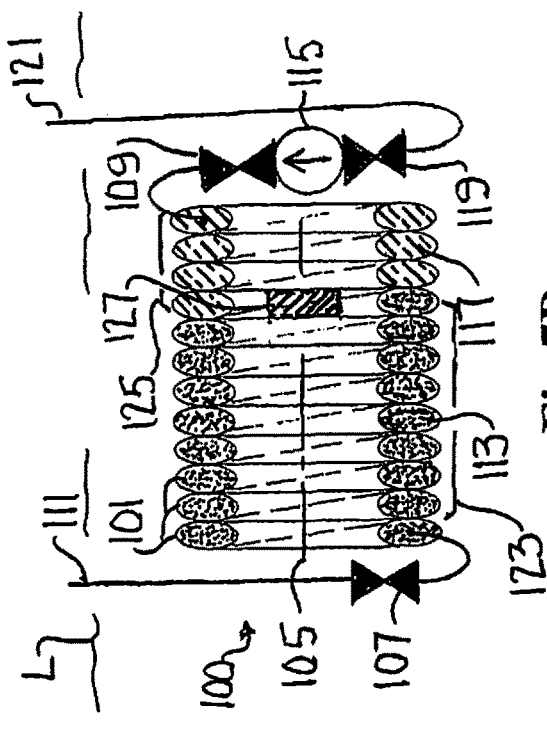

Looking at FIG. 7B, all three valves 107, 109 and 119 have been opened and compressible gas 113 is being pumped through the float valve 107 into the vessel 100, causing evacuation of the ballast medium 117 from the vessel 100 through the ballast valve 109 in a quantity measured by the ballast flow meter 115. Since the ballast medium 117 is incompressible, the vessel 100 is divided by the pig 127 into two compartments 123 and 125 of variably complementary volume. The quantity of ballast medium 117 remaining in the ballast compartment 115 is the total quantity of ballast medium 117 which filled the vessel 100 in FIG. 7A less the quantity of evacuated ballast medium 117 measured by the ballast flow meter 115.

Figure 7C:
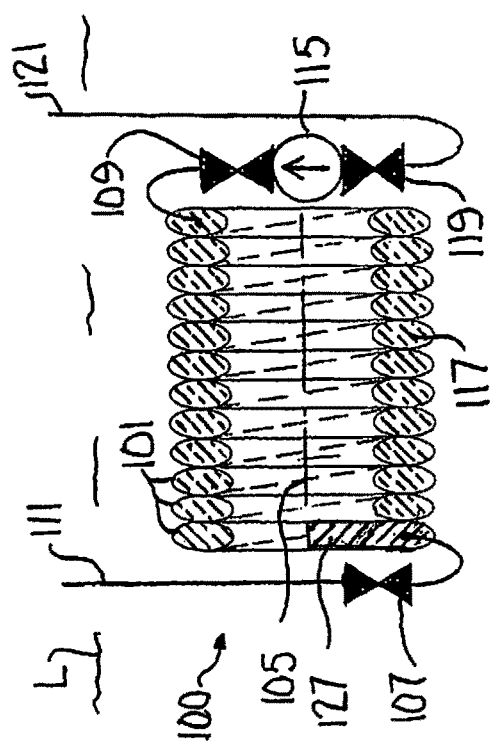

As seen in FIG. 7C, the ballast valve 109 has been closed, a predetermined amount of ballast medium 117 having been evacuated from the vessel 100 so as to cause the vessel 100 to descend toward its desired depth in the body of liquid L. Since the ballast valve 109 is closed, continued pumping of the compressible gas 113 through the float valve 107 into the vessel 100 increases the internal pressure of the vessel 100 without any significant change in the buoyancy of the vessel 100.

Figure 7D:
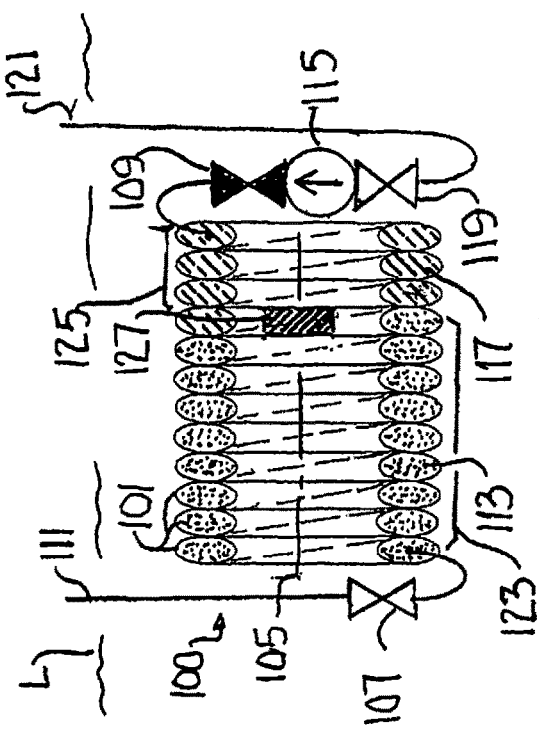

Moving on to FIG. 7D, the density of the compressible gas 113 has been increased sufficiently to bring the vessel internal pressure to a desired level to counteract the hydrostatic ambient pressure that is applied to the vessel 100. The float valve 107 has been closed, at least temporarily, to maintain the desired internal pressure of the vessel 100. This internal pressure can be monitored and increased or decreased by injecting or evacuating compressible gas 83 through the float valve 107 as the changing depth of the vessel 100 may require without changing the buoyancy of the vessel 100. If a change in quantity of ballast medium 117 in the vessel 100 is required, the ballast and flow meter valves 109 and 119 can be opened to admit or evacuate a metered amount of ballast medium 117.

By appropriate further manipulation of the float and/or ballast and flow meter valves 107 and 109 and 119, the location of the pig 127 in the vessel 100 can be reciprocally varied to raise or lower the vessel 100 in the body of liquid L while simultaneously, if desired, changing the density of the compressible flotation medium 113. Thus, changes in hydrostatic crush applied to the vessel 100 over a wide range of depths can be accommodated.

This application of the method is explained in specific relation to controlling a horizontally oriented coiled pipe vessel 100 in a body of liquid L, but applies to all shapes of vessels, compressible gas flotation mediums, incompressible ballast mediums and host liquids. This illustration is also explained in relation to the use of a pig 127 to separate the vessel 100 into hydraulically discrete compartments 123 and 125, as discussed above. However, this application is also useful if the vessel 100 is divided by mutually impermeable flotation and ballast mediums, also as discussed above.

Vessels with or without Attached Objects

As earlier discussed, the shape and orientation of the vessel V can be coordinated with the shape and orientation of an object O to be raised and lowered by the vessel V. For example, the vessel V can be designed with vertical and/or horizontal axes of symmetry, such as a hollow body with circular or polygonal cross-sections transverse to one of the axes of symmetry, one or more pipes wound in one or more loops, spirals or helixes about one of the axes of symmetry or a linear pipe aligned on one of the axes of symmetry. The center of buoyancy of the vessel V and the center of buoyancy of the object O can be coordinated, perhaps vertically aligned, so that not only the elevation but also the attitude of the object O in the body of liquid L can be controlled by controlling the elevation and attitude of the vessel V.

In an object manipulating application, the flotation and ballast mediums $M_F$ and $M_B$ would be selected so that, when the vessel V was filled with only one of the mediums $M_F$ or $M_B$, the vessel V would be capable of causing both the vessel V and the attached object O to ascend and descend, respectively, in the body of liquid L.

In some object manipulating applications, multiple vessels V can be attached to the same object O, the shapes and orientations of each vessel V being coordinated with the shape and orientation of the object O so that the elevation and attitude of the object O in the body of liquid L can be controlled by applying the present method to control each of the vessels V. In such a multi-vessel object-manipulating application, flotation and ballast mediums $M_F$ and $M_B$ would be selected which, when filling the vessels V, would be capable of causing the vessels V and the attached object O to ascend and descend, respectively, in the body of liquid L. Also, in a multi-vessel application, if the flotation medium $M_F$ is compressible, the quantity of the flotation medium $M_F$ contained in the flotation medium compartments $C_F$ of each vessel V and/or the incompressible ballast medium $M_B$ contained in the ballast medium compartments $C_B$ of each vessel V can be varied to cause the internal pressure of the pressure-containing vessels V to be within a counterbalancing range of their respective ambient pressure capabilities. In a multi-vessel object-manipulating application, the mediums $M_F$ and $M_B$ need not be the same in each vessel V. Furthermore, the vessels V may be independently caused to ascend or descend, and to do either at different rates, so as to apply rotation-producing moments to the object O.

Figure 8:
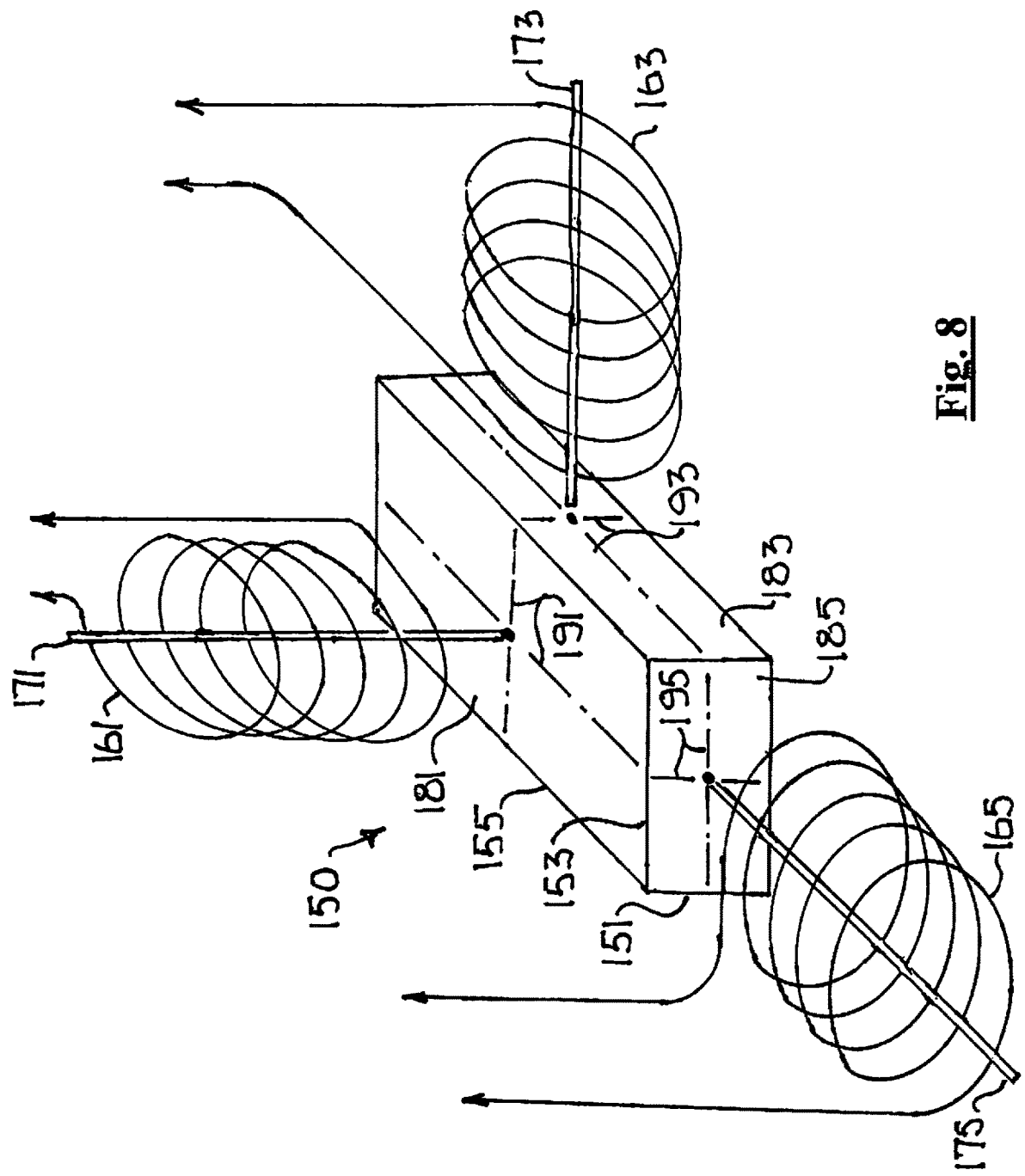
FIG. 8 is a one line diagram illustrating the method applied to multiple vessels to control the elevation and attitude of an object in a liquid.

For example, looking at FIG. 8, a box shaped object 150 with a height 151, a width 153 and a depth 155 of three different lengths is connected to three helically cylindrical pressure-containing vessels 161, 163 and 165, respectively. As shown, the vessels 161, 163 and 165 are rigidly connected to the object 150 by arms 171, 173 and 175, respectively, to the center points of the top, front and side faces 181, 183 and 185, respectively, of the object 150. Using the present method to control the elevation of each of the vessels 161, 163 and 165, the elevation and attitude of the object O in the host liquid L can be varied. As suggested by the axial coordinates 191, 193 and 195, the connection points can be positioned anywhere on the surfaces of an object O. The object O could be of any shape, the vessels V of any number and shape and the connection points located at any positions on the surface of the object O depending on the center of buoyancy of the object O and the attitudes that the object O is intended to take in the liquid L.

Primary and Secondary Pipelines as Vessels

Figure 1:
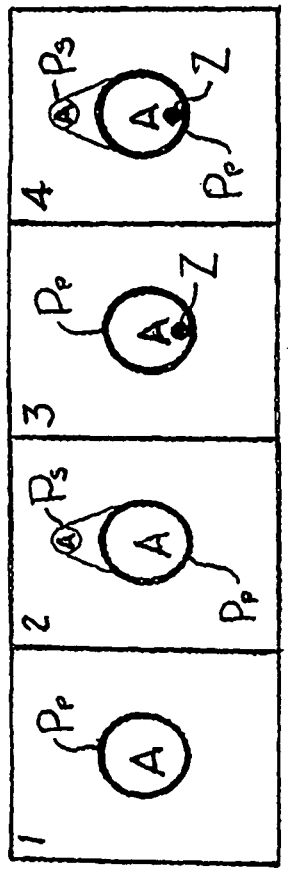
FIG. 1 is a block diagram illustration of the applications of the known air-assisted shallow water pipeline laying method.
Figure 9:
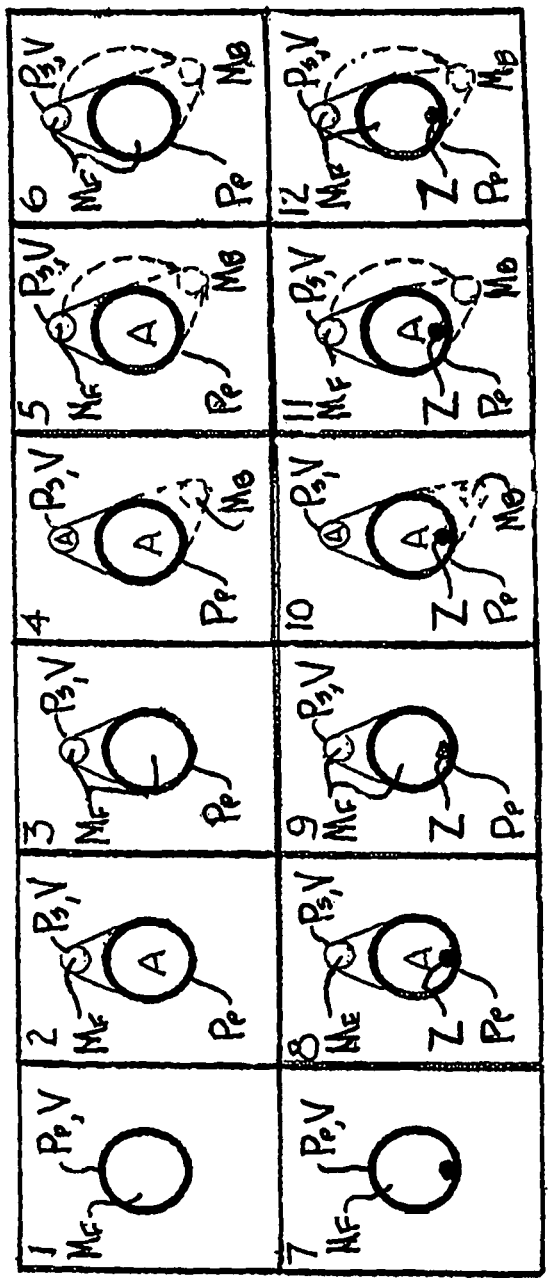
FIG. 9 is a block diagram illustrating twelve applications of the present method in laying deep water pipelines.

Turning to FIG. 9, the method is very useful in laying offshore pipelines, especially those to be laid at exceedingly great depths. In laying pipeline, the method is applied as hereinbefore discussed after the pipeline to be laid has been floated and towed to the laying site by association of the pipeline with a flotation medium, either air A or a liquid or gel $M_F$.

If the primary pipeline $P_P$ is the pressure-containing vessel V, association with the flotation medium is accomplished by pumping sufficient flotation medium into the primary pipeline $P_P$, V to cause the primary pipeline $P_P$ to float. If the secondary pipeline $P_S$ is the vessel V, association with the flotation medium is accomplished by piggybacking the secondary pipeline $P_S$ to the primary pipeline $P_P$ and pumping sufficient flotation medium into the secondary pipeline $P_S$, V to cause the primary pipeline $P_P$ to float. It is also possible, though not discussed in relation to FIG. 9, that the primary and secondary pipelines $P_P$ and $P_S$ will both be pressure containing vessels V, in which case association with the flotation medium is accomplished by piggybacking the secondary pipeline $P_S$ to the primary pipeline $P_P$ and pumping sufficient flotation medium into either or both pipelines $P_P$ and/or $P_S$ to cause the primary pipeline $P_P$ to float.

Looking at FIG. 9, each block 9/1-9/12 shows the pipeline to be laid as the primary pipeline $P_P$ in a different floated condition. Blocks 9/1-9/6 illustrate an empty primary pipeline $P_P$ while blocks 9/7-9/12 illustrate a primary pipeline $P_P$ containing one or more cables and/or other pipelines Z. In each of the blocks 9/1-9/12, the primary pipeline $P_P$ contains a flotation medium, either air A or a liquid or gel $M_F$. Gels, which are dispersions of solids in liquids, are preferred. In blocks 9/1 and 9/7, the primary pipeline $P_P$ is the vessel V of the present method and the flotation medium, a liquid or gel $M_F$, of the method is contained in the vessel V. In blocks 9/2-9/6 and 9/8-9/12, a secondary pipeline $P_S$ is piggybacked to the primary pipeline $P_P$. In blocks 9/2, 9/3, 9/5 and 9/6 and blocks 9/8, 9/9, 9/11 and 9/12 the secondary pipeline $P_S$ is the vessel V of the method and contains the liquid or gel flotation medium $M_F$ of the method. In blocks 9/4 and 9/10 the secondary pipeline $P_S$ is the vessel V of the method and contains air A as the flotation medium of the method.

In block 9/1, the primary pipeline $P_P$, V would sink if it did not contain sufficient flotation medium $M_F$ to float. The floated primary pipeline $P_P$, V can be sunk by gradually displacing flotation medium $M_F$ from the primary pipeline $P_P$, V with sufficient ballast medium $M_B$, perhaps seawater, to allow the combination to sink. In block 9/7, the same primary pipeline $P_P$, V contains a cable and/or other pipeline Z. Therefore, greater initial buoyancy is necessary to float the primary pipeline $P_P$, V and its contents Z. Still, the floated primary pipeline $P_P$, V can be sunk by gradually displacing flotation medium $M_F$ from the primary pipeline $P_P$, V with sufficient ballast medium $M_B$, perhaps seawater, to allow the primary pipeline $P_P$, V with its contents Z to sink.

In block 9/2, the primary pipeline $P_P$ contains air A but would still sink if it were not piggybacked to the secondary pipeline $P_S$, V which contains sufficient flotation medium $M_F$ to float the combination. The floated primary pipeline $P_P$ can be sunk by detaching the primary pipeline $P_P$ from the secondary pipeline $P_S$, V or by gradually displacing flotation medium $M_F$ from the secondary pipeline $P_S$, V with sufficient ballast medium $M_B$, perhaps seawater, to allow the combination to sink. In block 9/8, in the same combination of pipelines $P_P$ and $P_S$, V, the primary pipeline $P_P$ contains a cable and/or other pipeline Z. Therefore, greater initial buoyancy is necessary to float the combination and its contents Z. Still, the floated primary pipeline $P_P$ can be sunk by detaching the primary pipeline $P_P$ from the secondary pipeline $P_S$, V or by gradually displacing flotation medium $M_F$ from the secondary pipeline $P_S$, V with sufficient ballast medium $M_B$, perhaps seawater, to allow the combination with the contents Z to sink.

In block 9/3, the primary pipeline $P_P$ contains flotation liquid $M_L$ but would still sink if it were not piggybacked to a secondary pipeline $P_S$, V which contains sufficient additional flotation medium $M_F$ to float the combination. The floated primary pipeline $P_P$ can be sunk by detaching the primary pipeline $P_P$ from the secondary pipeline $P_S$, V or by gradually displacing flotation medium $M_F$ in the secondary pipeline $P_S$, V with sufficient ballast medium $M_B$, perhaps seawater, to allow the combination to sink. In block 9/9, in the same combination of pipelines $P_P$ and $P_S$, V, the primary pipeline $P_P$ contains a cable and/or other pipeline Z. Therefore, greater initial buoyancy is necessary to float the combination and its contents Z. Still, the floated primary pipeline $P_P$ can be sunk by detaching the primary pipeline $P_P$ from the secondary pipeline $P_S$, V or by gradually displacing flotation medium $M_F$ from the secondary pipeline $P_S$, V with sufficient ballast medium $M_B$, perhaps seawater, to allow the combination with the contents Z to sink.

In block 9/4, the primary pipeline $P_P$ contains air A and would float, and is piggybacked to a secondary pipeline $P_S$, V which is also filled with air A and would also float. The floated primary pipeline $P_P$ can be sunk by gradually displacing air A in the secondary pipeline $P_S$, V with sufficient ballast medium $M_B$ to cause the combination to sink. In block 9/10, in the same combination of primary and secondary pipelines $P_P$ and $P_S$, V, the primary pipeline $P_P$ contains a cable and/or other pipeline Z. Still, the floated primary pipeline $P_P$ can be sunk by gradually displacing air A in the secondary pipeline $P_S$, V with sufficient ballast medium $M_B$ to cause the combination with its contents Z to sink.

In block 9/5, the primary pipeline $P_P$ contains air A but would still sink if it were not piggybacked to a secondary pipeline $P_S$, V filled with sufficient flotation medium $M_F$ to float the combination. The floated primary pipeline $P_P$ can be sunk by gradually displacing flotation medium $M_F$ in the secondary pipeline $P_S$, V with sufficient ballast medium $M_B$ to allow the combination to sink. In block 9/11, in the same combination of pipelines $P_P$ and $P_S$, V, the primary pipeline $P_P$ contains a cable and/or other pipeline Z. Therefore, greater initial buoyancy is necessary to float the combination and the contents Z. Still, the floated primary pipeline $P_P$ can be sunk by gradually displacing flotation medium $M_F$ in the secondary pipeline $P_S$, V with sufficient ballast medium $M_B$ to allow the combination with its contents Z to sink.

In block 9/6, the primary pipeline $P_P$ contains flotation medium $M_F$ but would still sink if it were not piggybacked to a secondary pipeline $P_S$, V filled with sufficient additional flotation medium $M_F$ to float the combination. The floated primary pipeline $P_P$ can be sunk by gradually displacing flotation medium $M_F$ in the secondary pipeline $P_S$, V with sufficient ballast medium $M_B$ to allow the combination to sink. In block 9/12, in the same combination of pipelines $P_P$ and $P_S$, the primary pipeline $P_P$ contains a cable and/or other pipeline Z. Therefore, greater initial buoyancy is necessary to float the combination and the contents Z. Still, the floated primary pipeline $P_P$ can be sunk by gradually displacing flotation medium $M_F$ in the secondary pipeline $P_S$, V with sufficient ballast medium $M_B$ to allow the combination with its contents Z to sink.

Figure 10:
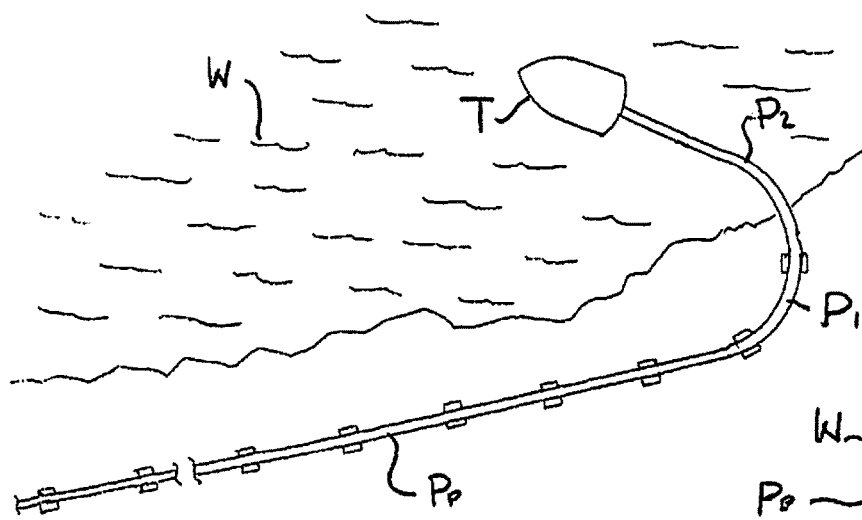
FIG. 10 is a top plan block diagram illustrating the transition of a pipeline being towed across the shoreline toward a laying site in accordance with the deep-water pipeline laying applications of FIG. 9.
Figure 11:
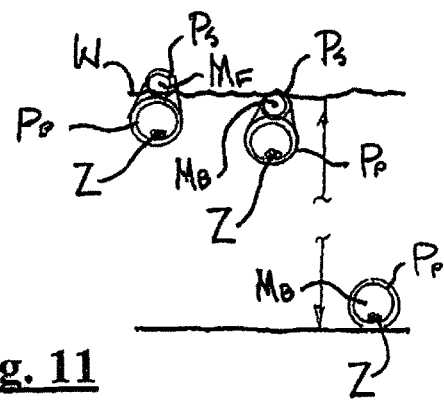
FIG. 11 is a diametric cross-sectional illustration of the descent of the pipeline as seen in FIG. 10 from the surface to the seabed.
Figure 12:
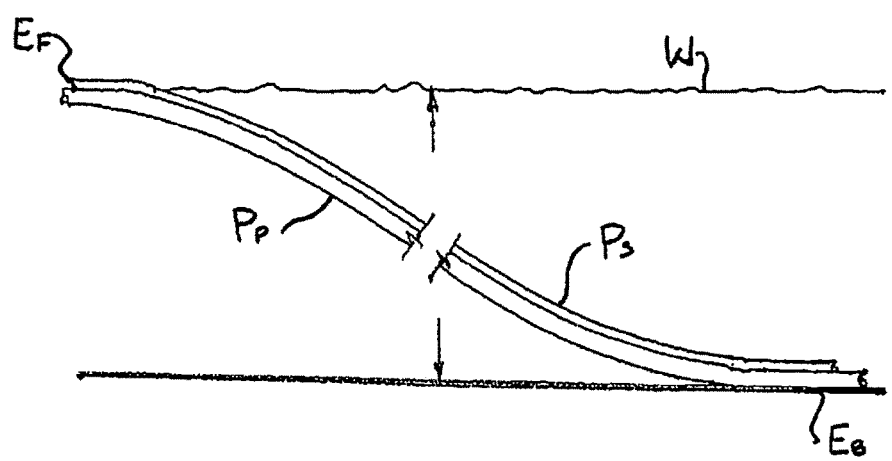
FIG. 12 is a longitudinal elevational illustration of the descent of the pipeline as seen in FIG. 10 from the surface to the seabed.

As seen in FIGS. 10-12, the primary pipeline $P_P$ is floated and towed to the pipeline laying site in one of the conditions described above in relation to FIG. 9. Looking at FIG. 10, the primary pipeline $P_P$, together with any piggybacked secondary pipeline $P_S$ and contents Z as seen in FIG. 9, is being towed by a tugboat T or other relatively small boat to an offshore pipeline laying site (not shown). As seen in FIGS. 11 and 12, the piggybacked secondary pipeline $P_S$ can have been attached to the primary pipeline $P_P$ in any manner known in the art. The on-shore portion $P_1$ of the towed pipelines can ride on any suitable delivery system known in the art, a preferred delivery system being disclosed in U.S. Pat. No. 7,927,040. As the on-shore portion transitions into an off-shore position, the offshore portion $P_2$ of the towed pipelines is floated as explained in reference to FIG. 9. Once the primary pipeline $P_P$ and any associated secondary pipeline $P_S$, contents Z and flotation medium A or $M_F$ have been towed to the laying site, the primary pipeline $P_P$ can be sunk by detachment of the secondary pipeline $P_S$ from the primary pipeline $P_P$, as seen in FIG. 11, or by applying the present method as disclosed in relation to FIG. 9. As seen in FIGS. 10 and 11, the sinking of the primary pipeline $P_P$ with any piggybacked secondary pipeline $P_S$ and contents Z, if applicable, is gradual. As flotation medium A or $M_F$ is exchanged with ballast medium $M_B$, the heavier ballast medium $M_B$ will cause the ballast end $E_B$ of the pipelines to descend as the flotation end $E_F$ of the pipelines remains substantially at a constant elevation at or near the surface of the water W. The transitioning portion of the pipelines between ballast and flotation ends $E_B$ and $E_F$ takes on a gradual S configuration, best seen in FIG. 12. As seen in FIG. 11, when the primary pipeline $P_P$ has settled on the seabed, it can be filled with ballast medium $M_B$ to secure and protect the pipeline $P_P$ and its contents Z, if any.

Given that water has a specific gravity of 1.0, and recognizing that foams and gels have a specific gravity approximating 0.5, if plastic pipe is used as a vessel in the present method the specific gravity of a lift system can be reduced to less than 0.1, making it possible that collapsible air bags used by divers, which are subject to Boyle's law, can be replaced by rigid vessels, which are not.

Thus, it is apparent that there has been provided, in accordance with the invention, a method for controlling the elevation, attitude and ambient pressure of pressure-containing vessels that fully satisfies the objects and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

The invention claimed is:

1. A flotation control system comprising:
a pressure containing vessel;
a first source of a flotation medium capable of increasing a buoyancy of said vessel in, a liquid and a second source of an incompressible ballast medium capable of decreasing said buoyancy of said vessel in the liquid;
a pig, held in confinement by the inner walls of said vessel and dividing said vessel into reciprocal serial hydraulically discrete compartments, a first said compartment in discrete communication with said first source for transmitting said flotation medium therebetween and a second said compartment in discrete communication with said second source for transmitting said incompressible ballast medium therebetween;
a first valve connected between said first source and said first compartment for controlling flow of said flotation medium into and out of said first compartment and a second valve connected between said second source and said second compartment for controlling flow of said incompressible ballast medium into and out of said second compartment, said first valve being operable to fix a quantity of said flotation medium in said first compartment and said second valve being operable to vary a quantity of said incompressible ballast medium in said second compartment to control an elevation of said pressure-containing vessel in the body of liquid; and
a flow meter measuring said quantity of incompressible ballast medium injected into and exhausted from said second compartment.

2. A flotation control system according to claim 1, said first and second valves being co-operable to vary a location of said pig between said flotation medium in said first compartment and said incompressible ballast medium in said second compartment.

3. A flotation control system comprising:
a pressure containing vessel;
a first source of a flotation medium capable or increasing a buoyancy of said vessel in a liquid and a second source of an incompressible ballast medium capable of decreasing said buoyancy of said vessel in the liquid, said flotation and incompressible ballast mediums, when abutting, creating an impermeable interface therebetween, said interface dividing said vessel into reciprocal serial hydraulically discrete compartments, a first said compartment in discrete communication with said first source for transmitting said flotation medium therebetween and a second said compartment in discrete communication with said second source for transmitting said incompressible ballast medium therebetween;
a first valve connected between said first source and said first compartment for controlling flow of said flotation medium into and out of said first compartment and a second valve connected between said second source and said second compartment for controlling flow of said incompressible ballast medium into and out of said second compartment, said second valve being operable to vary a quantity of said incompressible ballast medium in said second compartment to control an elevation of said pressure-containing vessel in the body of liquid, said first and second valves being co-operable to counterbalance said flotation medium in said first compartment against said incompressible ballast medium in said second compartment; and a flow meter measuring said quantity of incompressible ballast medium injected into and exhausted from said second compartment.

4. A flotation control system according to claim 3, said first and second valves being co-operable to vary a location, of said impermeable interface between said flotation medium in said first compartment and said incompressible ballast medium in said second compartment.

\* \* \* \* \*